US012227995B2

(12) United States Patent
Bencze

(10) Patent No.: US 12,227,995 B2
(45) Date of Patent: Feb. 18, 2025

(54) SLIMLINE CONNECTOR FOR CONNECTING A MOTOR LEAD EXTENSION WITH AN ELECTRIC MOTOR FOR WELLBORE APPLICATIONS

(71) Applicant: Halliburton Energy Services, Inc., Houston, TX (US)

(72) Inventor: Andras Bencze, Frimley (GB)

(73) Assignee: Halliburton Energy Services, Inc., Houston, TX (US)

(*) Notice: Subject to any disclaimer, the term of this patent is extended or adjusted under 35 U.S.C. 154(b) by 87 days.

(21) Appl. No.: 18/153,803

(22) Filed: Jan. 12, 2023

(65) Prior Publication Data

US 2024/0240528 A1 Jul. 18, 2024

(51) Int. Cl.

| | |
|---|---|
| ***E21B 17/02*** | (2006.01) |
| ***E21B 43/12*** | (2006.01) |
| ***H01R 13/523*** | (2006.01) |

(52) U.S. Cl.

CPC .......... *E21B 17/028* (2013.01); *E21B 17/023* (2013.01); *E21B 43/128* (2013.01); *H01R 13/523* (2013.01)

(58) Field of Classification Search

CPC ..... E21B 17/028; E21B 17/023; E21B 43/128

See application file for complete search history.

(56) References Cited

U.S. PATENT DOCUMENTS

| | | | | |
|---|---|---|---|---|
| 4,426,124 | A * | 1/1984 | Vandevier | H01B 17/305 439/271 |
| 5,567,170 | A | 10/1996 | Kroeber | |
| 6,676,447 | B1 | 1/2004 | Knox | |
| 2004/0058575 | A1 | 3/2004 | Nicholson | |
| 2008/0293280 | A1* | 11/2008 | Kennedy | H01R 13/405 439/274 |
| 2016/0024854 | A1* | 1/2016 | Clingman | H01R 13/6215 439/587 |
| 2017/0204680 | A1* | 7/2017 | Leismer | H01R 13/5219 |
| 2017/0244294 | A1* | 8/2017 | Holzmueller | H02K 5/132 |
| 2017/0350198 | A1* | 12/2017 | Ma | E21B 17/028 |
| 2022/0056767 | A1* | 2/2022 | Part | E21B 17/026 |

OTHER PUBLICATIONS

"PCT Application No. PCT/US2023/060696, International Search Report and Written Opinion", Oct. 6, 2023, 10 pages.

* cited by examiner

*Primary Examiner* — David Carroll

(74) *Attorney, Agent, or Firm* — DeLizio, Peacock, Lewin & Guerra LLP

(57) ABSTRACT

In some embodiments, an apparatus may comprise a slimline connector to connect a motor lead extension (MLE) to an electric motor of an electric submersible pump (ESP) to be positioned in a wellbore, the electric motor having a rotational axis. The slimline connector may comprise multiple power ports positioned circumferentially around an axis of the slimline connector, wherein the axis of the slimline connector is parallel with the rotational axis of the electric motor, and wherein each port of the multiple power ports is associated with a different electrical phase.

20 Claims, 20 Drawing Sheets

SLIMLINE CONNECTOR FOR CONNECTING A MOTOR LEAD EXTENSION WITH AN ELECTRIC MOTOR FOR WELLBORE APPLICATIONS

BACKGROUND

The disclosure generally relates to subsurface-capable tools for use in wellbores and more particularly, to electrical connections for electric submersible pumps (ESPs).

Different wellbore applications may include a motor or other components that require a cable for power and/or communication between the surface and downhole. For example, wells for hydrocarbon recovery may often rely on pressure from downhole to move the hydrocarbons to the surface of the wellbore. However, certain hydrocarbons may be too heavy to be moved to the surface of the wellbore solely by the downhole pressure. Thus, electric submersible pumps (ESPs) may be positioned in the wellbore to assist in moving the hydrocarbons to the surface. Such ESPs may require a supply of power for operation. Such ESPs need a conductive cable to supply power and/or communication between components at the surface of the wellbore and components positioned downhole in the wellbore. However, for such ESPs, conventional cables may include a standard motor lead extension (MLE) to motor connection using tape-in pot-head connectors that may require preparation during the ESP deployment in the field (e.g., the wellsite). The preparation of the connection may include 1) pulling the motor lead wire out from the motor head, 2) securing the electrical receptacles to the motor lead wire, 3) connecting the individual electrical sockets to the individual pins on the pot-head connector, 4) insulating each individual pin-socket joint and 5) inserting the entire assembly back into the motor head. This last step may be a blind assembly. During this process, the connection components may be exposed to the environment (such as dust, rain, sun, ice, etc.) for extended periods. Accordingly, the connection components may be prone to contamination and damage during the preparation and assembly process. This contamination and damage could lead to reduced performance and/or failures of the connection during the assembly process or during operation. This process of making a tape-in connection may require time, skilled personnel, and diligence of the technician performing this task. Accordingly, in some instances, human error and variability may not be eliminated from this assembly process. Furthermore, in some ESP applications, a motor shaft diameter may need to be maximized to increase the motor power rating. Due to size and the connector geometry (usually a single round connection), the tape-in type pot-heads may require significant space in the motor head, e.g., because these potheads may require accommodation within the ESP diameter. Depending on the motor power rating, a motor lead extension (MLE) size and the pot-head size may be incompatible with the pot-head connection in the motor head, and thus, may not fit within the ESP diameter (especially on smaller motor series). This may lead to derating of the motor power due to the use of a small gauge MLE cable.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody aspects of the disclosure. However, it is understood that this disclosure may be practiced without these specific details.

Overview

In some embodiments, a slimline connector described herein may streamline the connection process and optimize a sizing of the pump motor of an ESP system. A primary advantage over the conventional tape-in potheads is the enclosed plug-in type of connection, eliminating a need for preparation at the well site, thus reducing assembly time and a potential of contamination and/or damage to various electrical components. At a well site, a field technician may remove a protective cap from the motor head connection and the cap from the pothead/connector. The field technician may position and align the pothead with a connection port on the motor head, slides the pothead to engage and make up the connection. This type of connection may be completed within a short period. Weather conditions may necessitate some preliminary preparation of the work area, although this is the case for the tape-in pothead connections too. The field technician may require minimal training to install the slimline connector to the motor of the ESP, as basic mechanical and electrical knowledge and standard field installation skills are amply sufficient. The motor head connection may consist of a plurality of individual ports (three are shown), circumferentially positioned, and machined parallel with the motor rotational axis. Although the design may introduce some complexity to the motor head geometry, the allowance for larger diameter motor shaft may supersede the machining cost. In some embodiments, an electrical insulation system comprising connector pins and sockets may be preassembled into custom-made electrically insulating components in the motor head and pothead respectively. The material of the insulators may be comprised of organic (PEEK) materials, non-organic (ceramic) materials, or a combination of organic and non-organic materials. The plug-in connection enabled by the enclosed slimline connector (and the connection components tightly installed inside the motor head and the connector housing) may reduce a risk of fatigue failure of the electrical connection because of the vibration over the entire ESP run-life.

Example Slimline Connector

Figure 1:
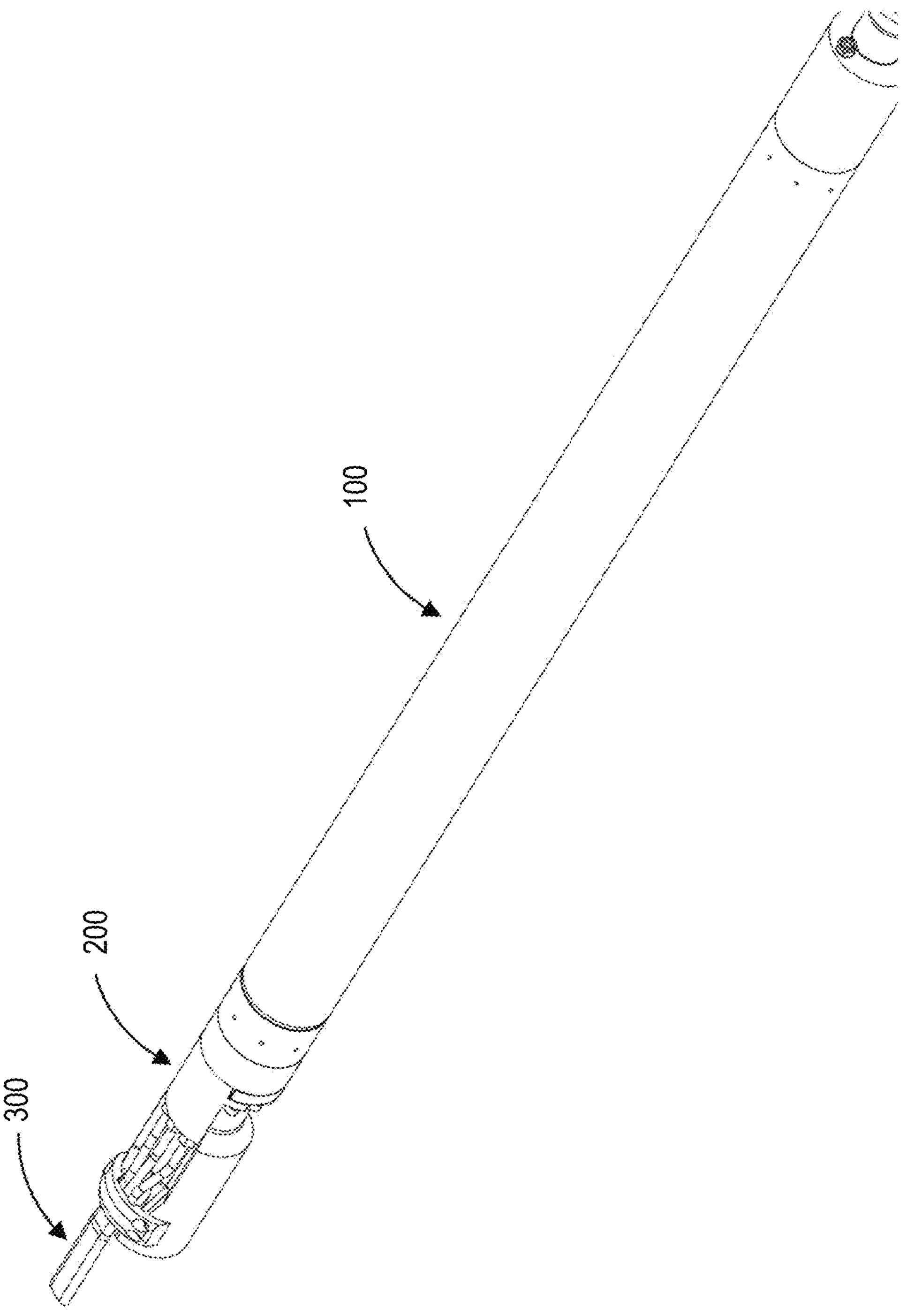
FIG. 1 depicts an isometric view of an example electric motor of an electric submersible pump (ESP) that includes a slimline connector and MLE, according to some embodiments.
Figure 19:
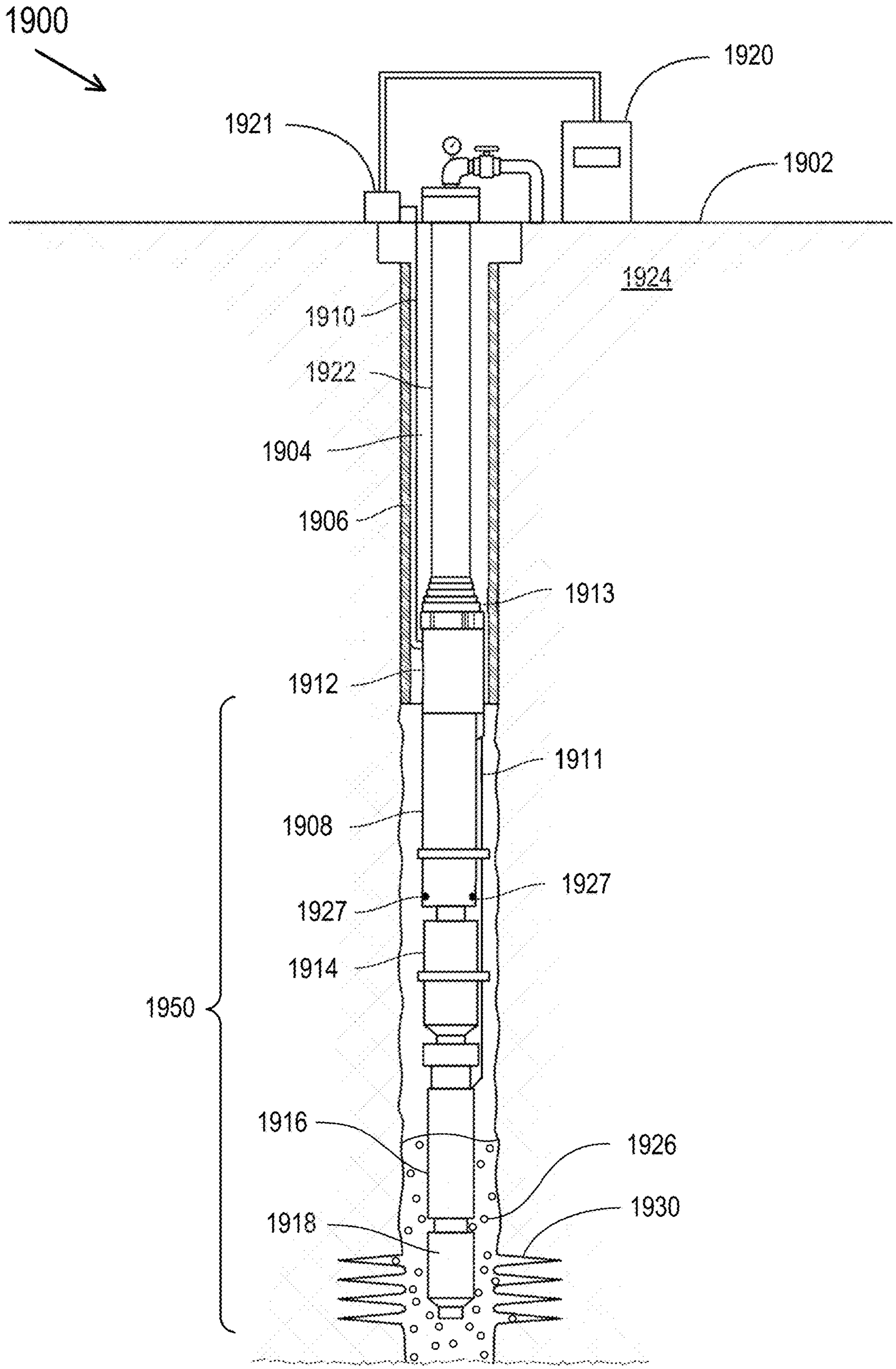
FIG. 19 depicts an example well system having an ESP, according to some embodiments.

FIG. 1 depicts an isometric view of an example electric motor of an electric submersible pump (ESP) that includes a slimline connector and MLE, according to some embodiments. A motor 100 (such as an electric motor) may be utilized in electric submersible pump (ESP) applications. The motor 100 may be powered from a surface power generation unit such as a gas or diesel generator through a variable speed drive (VSD) and transformer. Power may be conveyed down to the motor 100 through an electrical cable 1910 as depicted in FIG. 19 (main cable, round profile), which crosses over to a motor lead extension (MLE) 300 (flat cable) above one or more pumps to minimize a radial height of the cable over the length of the electric submersible pump (ESP) system. The motor lead extension (MLE) may terminate in a pot-head connector. The MLE 300 depicted in FIG. 1 terminates at a slimline connector 200. This slimline connector is shown in greater detail in FIG. 2.

Figure 2:
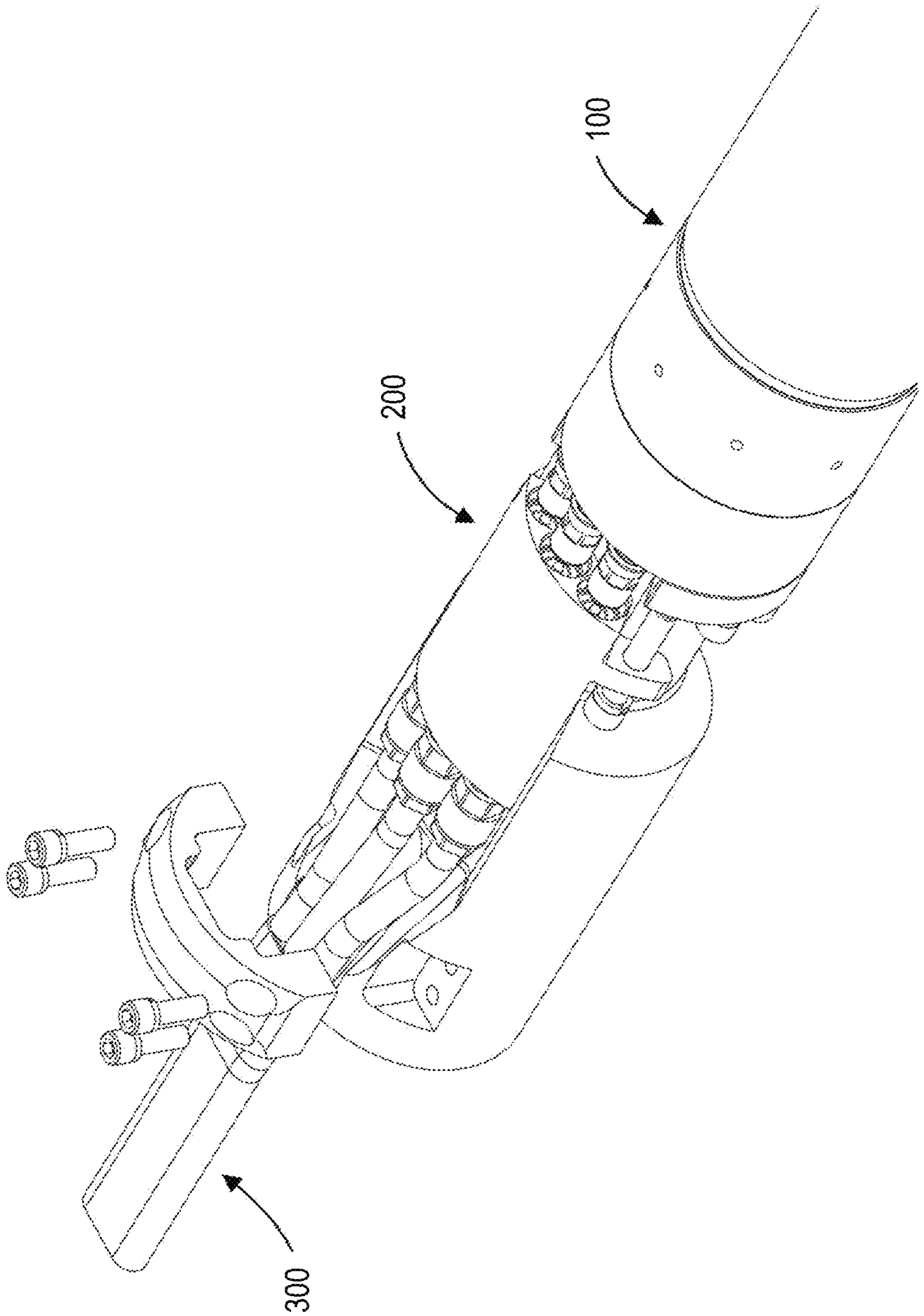
FIG. 2 depicts a more detailed isometric view of the example slimline connector and motor lead extension (MLE) on a motor head, disconnected from the motor head, according to some embodiments.

FIG. 2 depicts a more detailed isometric view of the example slimline connector and motor lead extension (MLE) of FIG. 1 on a motor head, disconnected from the motor head, according to some embodiments The slimline connector 200 is depicted as disconnected from the motor 100. In this illustration, the slimline connector 200 may be found in a position before the field connection to the motor 100 is performed.

Figure 3:
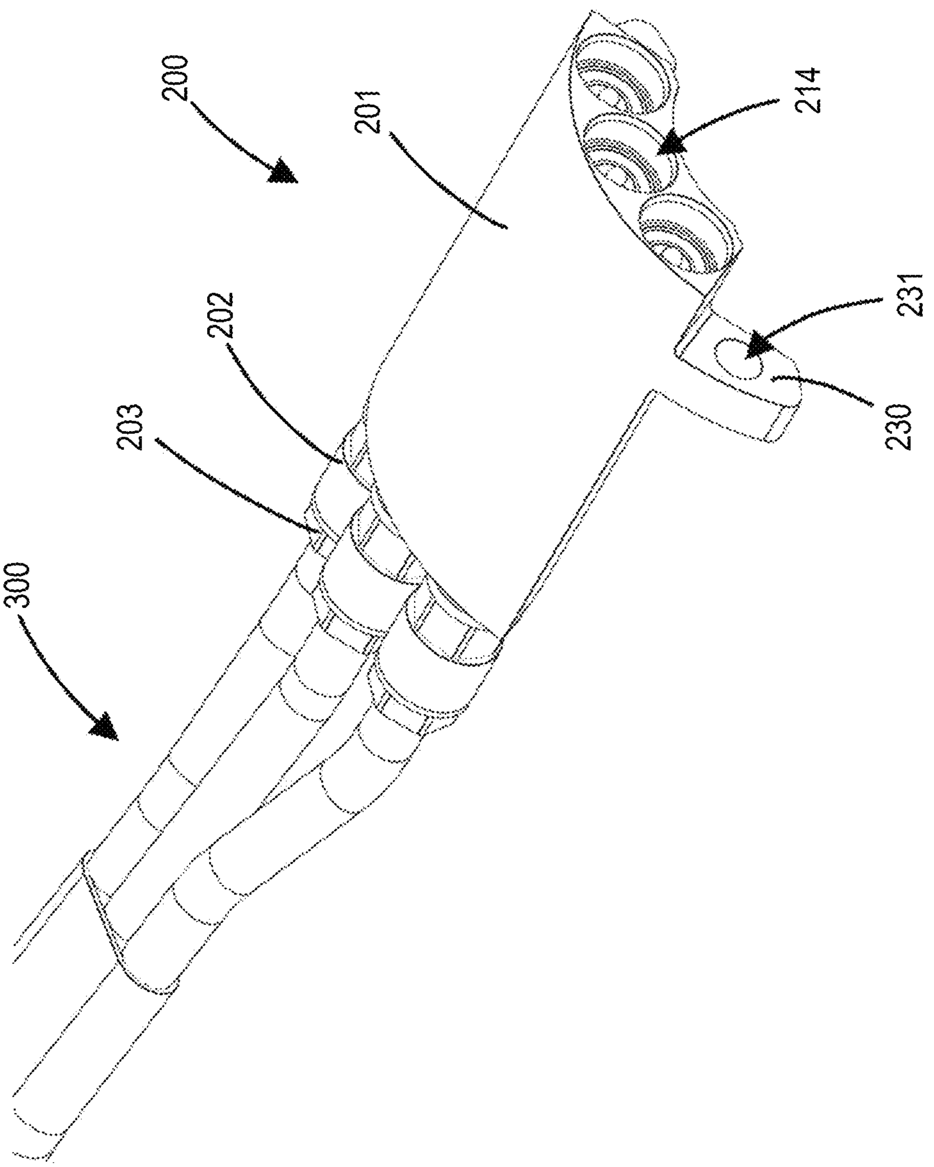
FIG. 3 depicts an isometric view of the example slimline connector and motor lead extension (MLE) separated from the motor, according to some embodiments.
Figure 4:
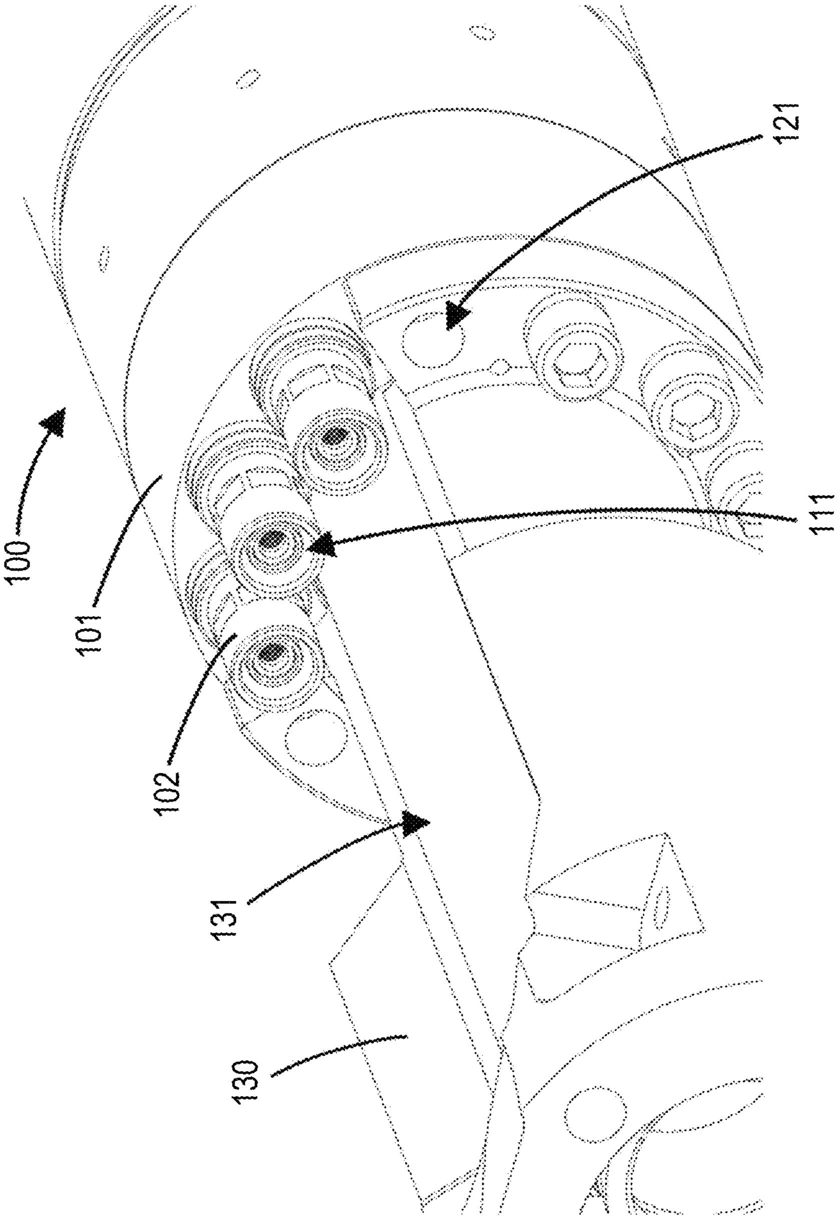
FIG. 4 depicts an isometric view of the motor head showing the connection ports in the motor head, according to some embodiments.

Details of this connector are presented in FIG. 3 and FIG. 4. Further details of this embodiment are presented in FIG. 9 through FIG. 11. In FIG. 3, a connector housing 201 encloses the electrical connection system terminated onto the motor lead extension's (MLE) 300 individual phases (FIG. 3). A plurality of axial cavities 220 (see FIG. 9) may be positioned at pre-defined radial and angular locations on an end face of the connector housing 201 which may be configured to accept individual phase connector components. The compression nuts 202 and lock nuts 203 and a rear face of the connector housing 201 may provide the sealing and retention for each individual phase of the motor lead extension (MLE) 300.

Similarly, on the motor 100, a plurality of through axial holes 111 (see FIG. 4, three are shown) in the motor head adaptor 101 may be positioned at the same position as the axial cavities 220 in the connector housing 201 (FIG. 3). One or more receptacle guide tubes 102 may protrude from the motor head adaptor 101 and form the motor connector guiding system. In some embodiments, the connector housing 201 may include a lug 230 and a through-hole 231 on each side of the connector. The lugs 230 and through-holes 231 may be used to secure the slimline connector 200 to the motor head adaptor 101 through connection holes 121 in the motor head 130 by means of threaded fasteners 213 (not shown in FIG. 4, shown in FIG. 7). The receptacle guide tubes 102 may also be mounted parallel to the rotational axis of the motor 100.

Figure 5:
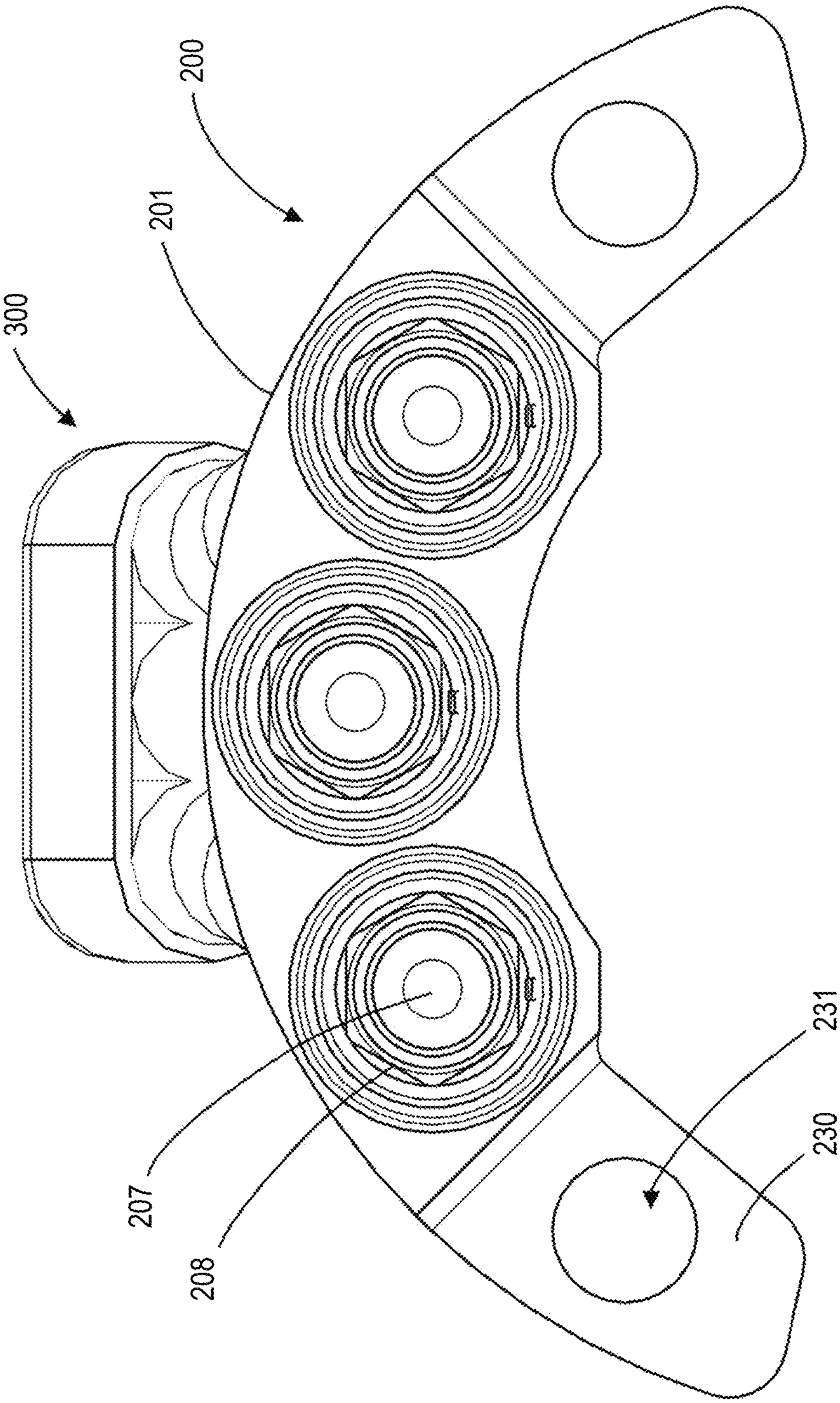
FIG. 5 depicts a front view of the example slimline connector, according to some embodiments.

A front view of the slimline connector 200 and the motor lead extension (MLE) 300 is shown in FIG. 5, according to some embodiments. Power pins 207 and concentric power pin insulators 208 (three are shown) and their locations on the connector housing 201 are depicted in a radial configuration. The radial configuration of the power pins 207 may allow the slimline connector 200 to also maintain a radial shape, allowing for increased motor sizing in the wellbore (i.e., the connector requires less space in the wellbore than would more traditional connectors). The concentric power pin insulators 208 (which, along with the power pins 207 as depicted from this front view may be referred to as a "power port") may also be circumferentially disposed on the slimline connector 200. In some implementations, the concentric power pin insulators 208 and power pins may be adjacently disposed along the radial shape of the slimline connector 200. In some embodiments, the lugs 230 are extensions of the connector housing 201 body (machined features in the connector housing).

Figure 6:
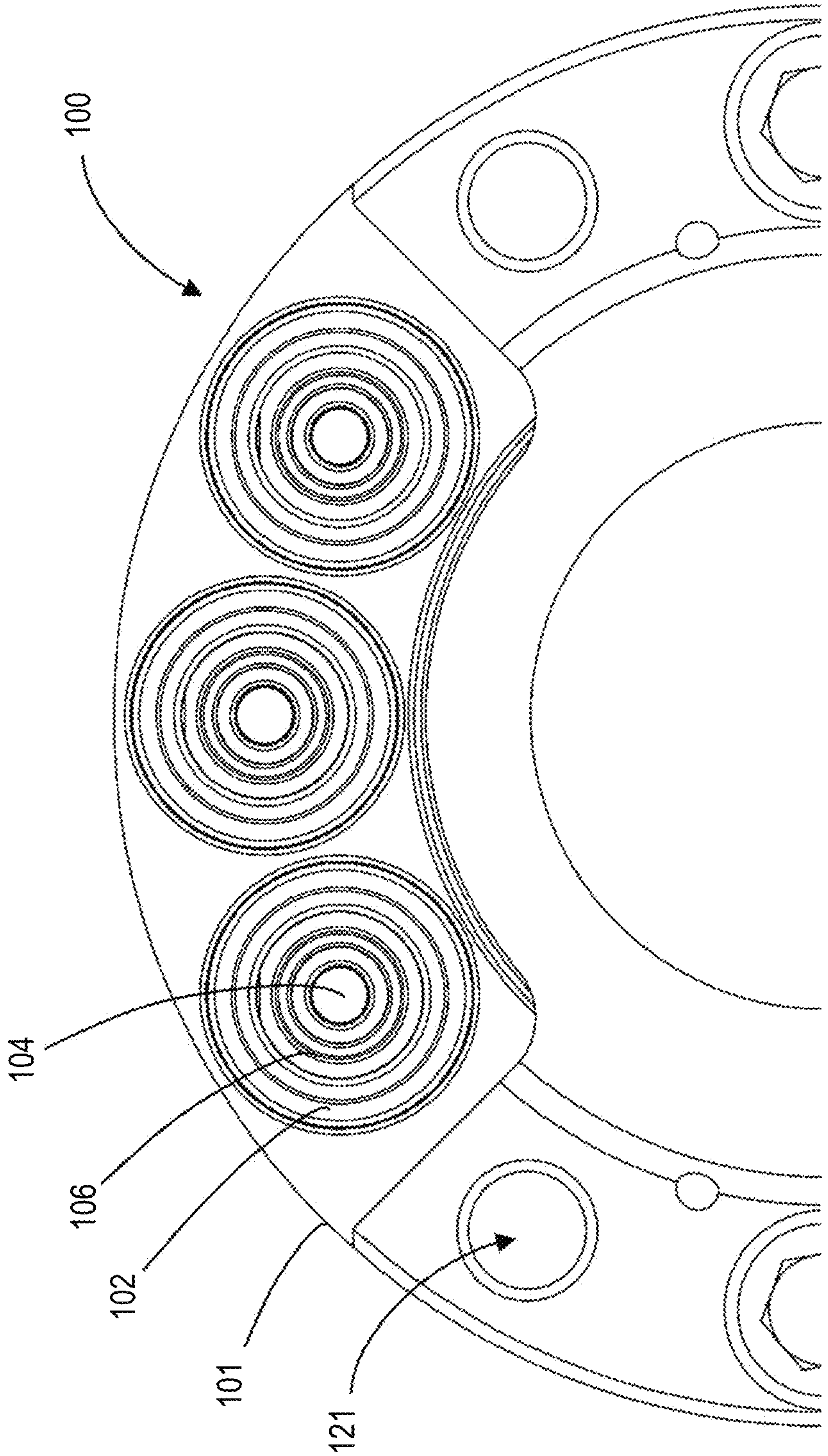
FIG. 6 depicts a front view of the example motor head, according to some embodiments.

FIG. 6 depicts a front view of the motor head adaptor, according to some embodiments. FIG. 6 presents a phase distribution on the motor head adaptor 101, with a (receptacle) power socket 104 in the center, surrounded by a power socket front electrical insulator sleeve 106 and enclosed by the receptacle guide tube 102. The location of the connection holes 121 on the motor head 130 is also presented herein. FIGS. 3-6 may depict the axial orientation of the connection with the motor head which may allow the motor shaft 150 outer diameter to be maximized. For example, the slimline connector 200 may be mounted parallel to a rotational axis of the motor 100. In contrast, more traditional tape-in type potheads may utilize a connector that is inclined by up to 10° with respect to the motor axis. In designing the slimline connector 200 to have a compact geometry, to be mounted parallel with the motor axis, and whereby the three individual phases of the connection are positioned in a circumferential orientation, the slimline connector 200 may contribute to a considerable space saving inside the motor head in its radial direction. This radial space may be utilized to increase the shaft diameter; thus, higher power may be transmitted from the motor to the pump for the same motor frame size (same series). A flat or angular connector, for example, may impede into this radial space and result in a sub-optimal motor sizing. In some embodiments, the slimline connector may be used on any motor series (319 series, 375 series, 400 series, 456 series, etc.).

In some embodiments, the individual phases of the slimline connector 200 may be positioned at predefined distances from one another, similar to how the three axial cavities 220 (see FIG. 9) may be positioned at pre-defined radial and angular locations on an end face of the connector housing 201. Having the individual phases at predefined distances from each other may largely reduce or eliminate a risk of electrical failure (shorting, arcing, etc.) between the individual phases. Each phase may be protected by the individual insulator sleeve 106 in single cavities. The distance between phases may be increased many-folds compared to conventional potheads, and this may make it difficult for electrical arcing (discharge) between the phases compared to the tape-in potheads.

Figure 7:
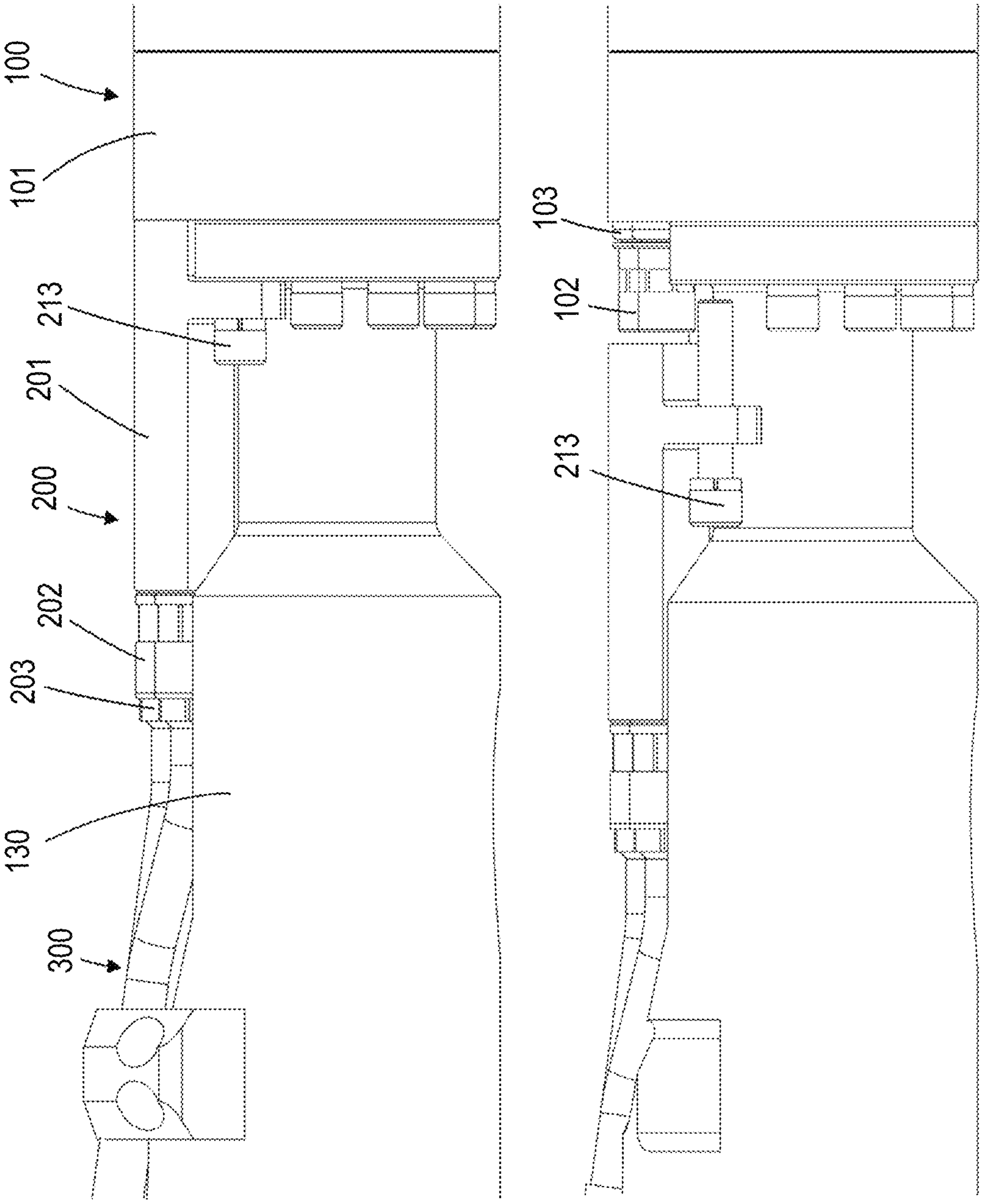
FIG. 7 depicts a side view of the example slimline connector and motor lead extension (MLE) in connected and in disconnected states, according to some embodiments.

FIG. 7 depicts a side view of the example slimline connector and motor lead extension (MLE) in connected and in disconnected states, according to some embodiments. Just before the connection, the slimline connector 200 rests within a recess 131 (refer to FIG. 4) on the motor head 130 and lines up with the receptacle guide tubes 102 installed in the motor head adaptor 101 prior to connection. In some embodiments, the mating of the slimline connector 200 and the receptacle guide tubes 102 may occur when the connector housing 201 is pushed over the receptacle guide tubes 102. To assist with the connector mating, one or more threaded fasteners 213 may be used.

Figure 8:
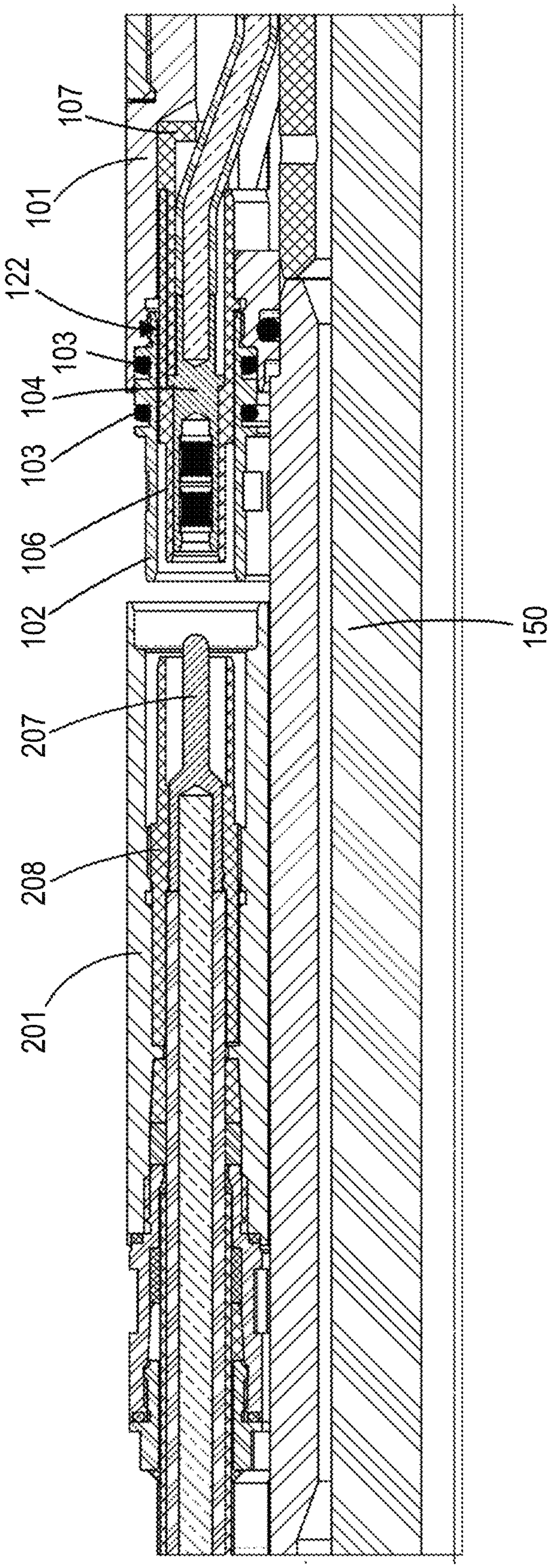
FIG. 8 depicts a first cross-sectional view of the example slimline connector un-mated with the motor head through one of the phases of the connection, according to some embodiments.
Figure 9:
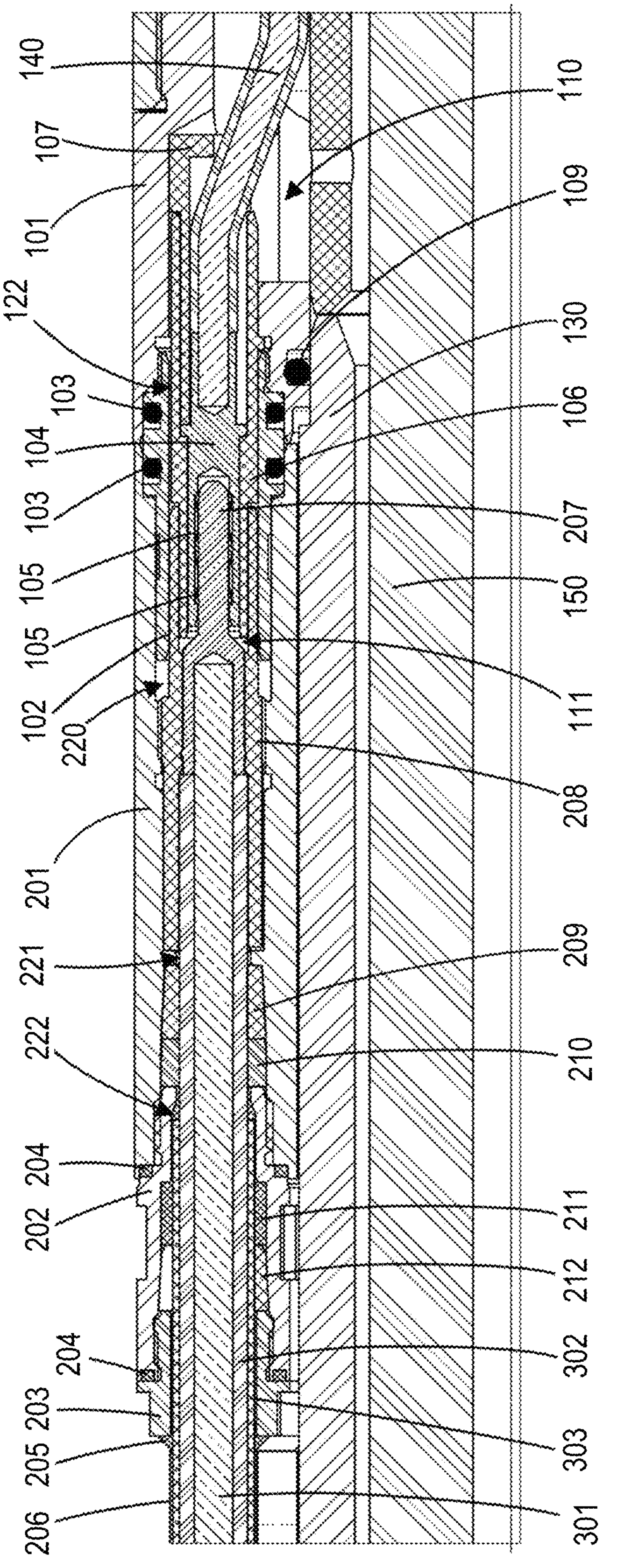
FIG. 9 depicts a first cross-sectional view of the example slimline connector mated with the motor head through one of the phases of the connection, according to some embodiments.
Figure 10:
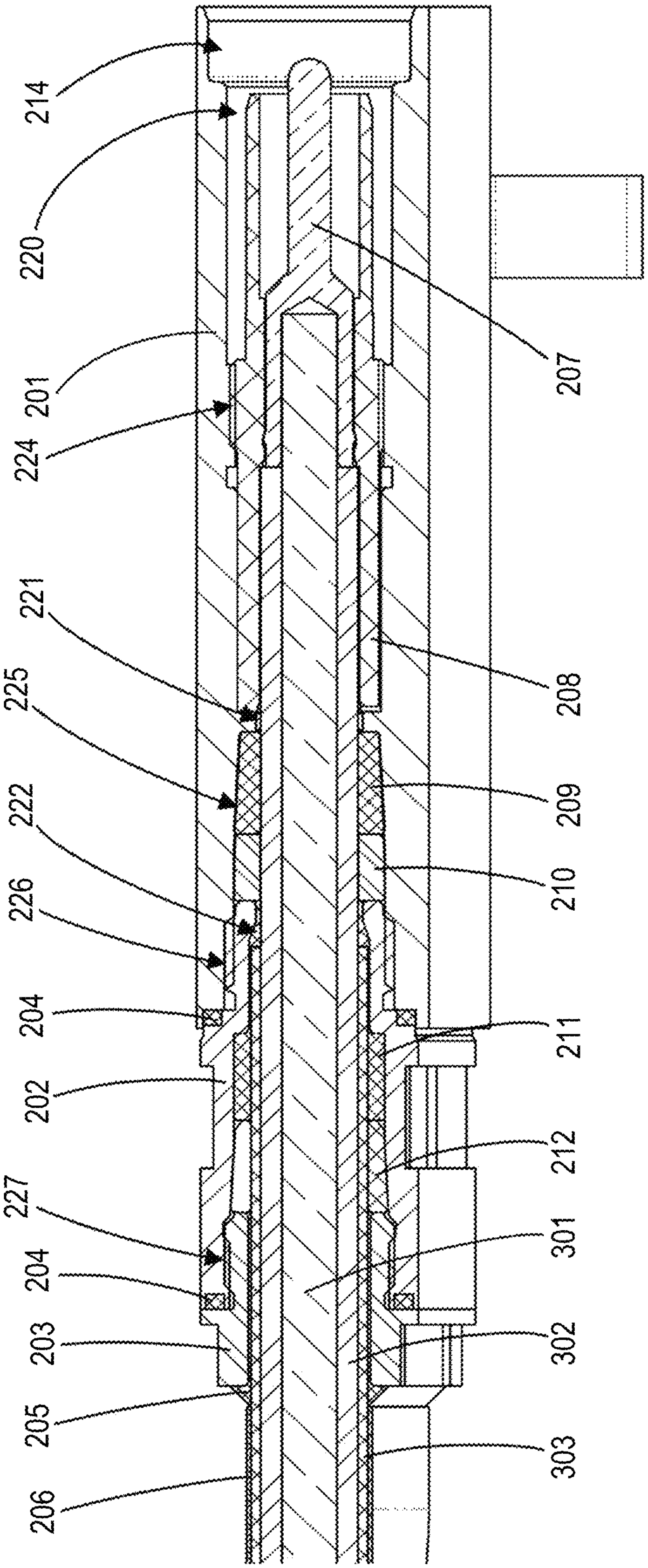
FIG. 10 depicts a first cross-sectional view of the example slimline connector through one of the phases of the connection, according to some embodiments.

Cross-sections showing the internal arrangement of the connector components through various phases of the connection in both the un-mated and mated connections are illustrated in FIG. 8, FIG. 9, and FIG. 10 respectively. FIG. 8 depicts a first cross-sectional view of the example slimline connector un-mated with the motor head through one of the phases of the connection. FIG. 9 depicts a first cross-sectional view of the example slimline connector mated with the motor head through one of the phases of the connection, according to some embodiments. FIG. 10 depicts a first cross-sectional view of the example slimline connector through one of the phases of the connection, according to some embodiments.

In some embodiments, the primary seal may be formed between the connector housing 201 and the receptacle guide tube 102 by means of the O-ring 103. When the slimline connector 200 is fully engaged with the receptacle guide tubes 102, the O-ring 103 may form a pressure seal between a sealing face 214 of the connector housing 201 and the O-ring groove inner diameter of the receptacle guide tube 102. Insulators 106 and 208 may comprise insulator sleeves and may overlap and increase an insulation thickness and a high voltage arc tracking length over a power pin 207 and a power socket 104 connection. Motor oil from the motor internal volume 110 may transfer from the motor 100 to the slimline connector 200 through an annular gap 122 between the power socket front electrical insulator 106 outer diameter and the receptacle guide tube 102 inner diameter. The motor oil may also fill an axial cavity 220, an annular area 221 between the motor lead extension (MLE) 300, an insulation jacket 302 outer diameter, and the connector housing 201 through the axial cavity 220 inside diameter, and the annular area between a lead sheath 303 outer diameter and the compression nut 202 inside diameter, up to an epoxy resin 211.

A detailed description of the slimline connector 200 components and the connector system inside the motor 100 are now described. FIG. 10 depicts a first cross-sectional view of the example slimline connector disconnected from the motor head, according to some embodiments. The slimline connector 200 may comprise: the connector housing 201, the power pin 207, the concentric power pin insulator 208, a sealing grommet 209, a compression collar 210, the compression nut 202, a split retaining collar 212, a lead washer 204, and the lock nut 203. In some embodiments, the concentric power pin insulator 208 may be made from polyetheretherketone (PEEK) or a similar electrically insulating material. The connector housing 201 may comprise the plurality of axial cavities 220 as described previously. In some embodiments, the concentric power pin insulators 208 may be secured in the axial cavity 220 by means of a threaded connection 224. In some embodiments, the power pin 207 may be terminated onto a solid copper conductor 301 of the motor lead extension (MLE) 300. In some embodiments, the power pins 207 may be soldered onto the solid copper conductor 301. In other embodiments, the power pins may be threaded and crimped onto the solid copper conductor 301.

In some embodiments, the lock nut 203, lead washer 204, and the split retaining collar 212 may be installed over the lead sheath 303 of the motor lead extension's (MLE 300) individual phases, in the order listed above. The compression nut 202, the lead washer 204, the compression collar 210 and the sealing grommet 209 may be installed over the insulation jacket 302 of the motor lead extension (MLE) 300 individual phases, in the order listed above. After all components are installed on the individual phases of the motor lead extension (MLE) 300, the plurality of phases may be inserted into the connector housing 201 simultaneously. The power pins 207 may locate firmly inside the concentric power pin insulators 208. The sealing grommet 209 may stop against a tapered sealing face 225 of the axial cavity 220. The compression collar 210 may stop against the end face of the sealing grommet 209. By threading in the compression nut 202 into a tapped hole 226 in the connector housing 201, the compression collar 210 may be compressed against the sealing grommet 209 which slides axially along the insulation jacket 302. Due to the tapered sealing face 225, the sealing grommet 209 may be compressed radially onto the insulation jacket 302. A seal may be formed between the tapered sealing face 225 and the sealing grommet 209 outer diameter and between the sealing grommet 209 inner diameter and the insulation jacket 302 outer diameter. The compression of the sealing grommet 209 may stop when the compression nut 202 touches the end face of the connector housing 201. At the same time, the lead washer 204 may also be compressed into its location on the connector housing 201, forming a pressure tight seal between the compression nut 202 and the connector housing 201. An epoxy resin 211 may be injected into the annular area 222 between the compression nut 202 inner diameter and the insulation jacket 302 outer diameter to form a fluid barrier. The epoxy resin may also enclose the cable lead sheath 303 up to the split retaining collar 212.

By axially compressing the split retaining collar 212 while threading the lock nut 203 into the tapped hole 227 in the compression nut 202, the split retaining collar 212 may clamp down onto the lead sheath 303. A similar tapered face to 225 in the compression nut 202 assists with the retaining collar 212 compression onto the lead sheath 303. The rate of compression of the retaining collar 212 onto the lead sheath 303 may be limited by the axial travel of the lock nut 203 when it stops against the end face of the compression nut 202. A second lead washer 204 may be compressed into its location in the compression nut 202, forming a pressure tight seal between the lock nut 203 and the compression nut 202. In some embodiments, a secondary fluid barrier 205 (see FIG. 10) may be formed between the lock nut 203 and the cable lead sheath 303 by means of a low temperature lead-based solder. In some embodiments, the exposed lead sheath 303 outside the slimline connector 200 and up to the metal jacket (not depicted) may be surrounded by a few layers of high modulus tape 206 which may provide structural support for the motor lead extension (MLE) 300 conductors at the location where the metal jacket has been removed.

Figure 11:
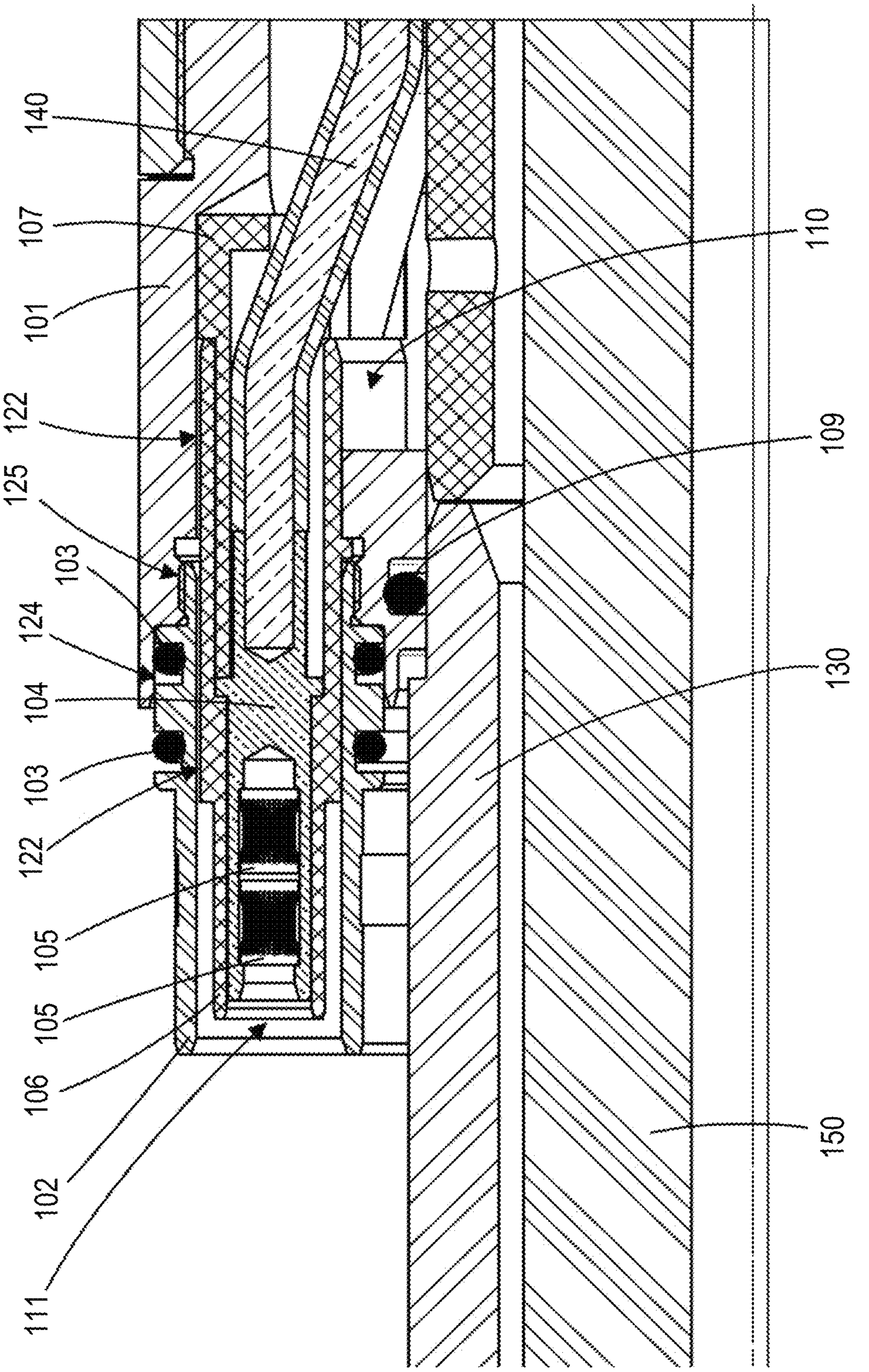
FIG. 11 depicts a first cross-sectional view through one of the phases of an example connection receptacle in the motor head, according to some embodiments.

FIG. 11 depicts a first cross-sectional view of an example connection receptacle in the motor head, according to some embodiments. An electrical connector system inside the motor head adaptor 101 shown in FIG. 11, may comprise: the power socket 104, one or more electrical contacts 105, the power socket front electrical insulator (insulator sleeve) 106, a power socket rear electrical insulator 107, the receptacle guide tube 102 and the O-rings 103. As shown in FIG. 6, the power socket front electrical insulator 106 may be visible as an insulator sleeve on the face of the motor head adaptor 101, while the power socket rear electrical insulator 107 may reside within the motor head adaptor 101. The receptacle guide tube 102 may be secured into the motor head adaptor 101 by means of the threaded connection 125. The power socket 104 may terminate onto a motor lead 140. In some embodiments, the power socket 104 may be crimped onto the stranded core of the motor lead 140. In some embodiments, the power socket 104 may include the electrical contacts 105. The power socket 104 may be surrounded by the power socket front electrical insulator (insulator sleeve) 106 and the power socket rear electrical insulator 107. The power socket rear electrical insulator 107 may also enclose part of the motor lead 140. In some embodiments, the power socket front electrical insulator 106 and the power socket rear electrical insulator 107 may be comprised of PEEK or a similar electrically insulating material. In some embodiments, to prevent fluid migration between the well bore and the motor internal volume 110, elastomeric seals may be utilized. An O-Ring 109 may provide the seal between the motor head adaptor 101 and the motor head 130. The O-ring 103 may provide the seal between the motor head adaptor 101 and the receptacle guide tubes 102.

In some embodiments, each receptacle guide tube 102 may enclose each power socket 104 and corresponding insulating cover inside the motor head. In some embodiments, the receptacle guide tubes 102 may be formed from steel or an alloy of similar strength and performance properties. The receptacle guide tubes 102 may serve multiple functions including: guarding the insulators 107-106 and the power socket 104 from mechanical damage during the connector installation, providing a sealing surface for the elastomeric O-Ring (such as elastomeric O-ring 103) or a metallic C-Ring (described in FIG. 13), and assisting with slimline connector 200 assembly during the field connection, protruding out from the motor head and forming a guide for the slimline connector 200.

Traditional tape-in and plug-in potheads may comprise of a common insulator in both motor head and connector housings, forming a round connector. In the slimline connector 200, each power lead, pin and socket may be housed in individual axial holes, such as the axial cavities 220. Instead of a round insulator, the slimline connector 200 may utilize circumferentially distributed insulators in the individual axial cavities 220. This arrangement of the individual phases within the MLE connector housing and motor head may enable the slimline connector 200 to have a smaller height compared to the conventional potheads.

In some embodiments, when servicing the motor in the shop and the electric submersible pump (ESP) in the field, motor oil from the motor inside the motor internal volume 110 may escape through the annular gap 122 between the power socket front electrical insulator 106 outer diameter and the receptacle guide tube 102 internal diameter. In some embodiments, customized protective caps and O-rings (not shown) may be installed over the receptacle guide tubes 102 to prevent motor oil leak during the motor or ESP servicing.

Figure 12:
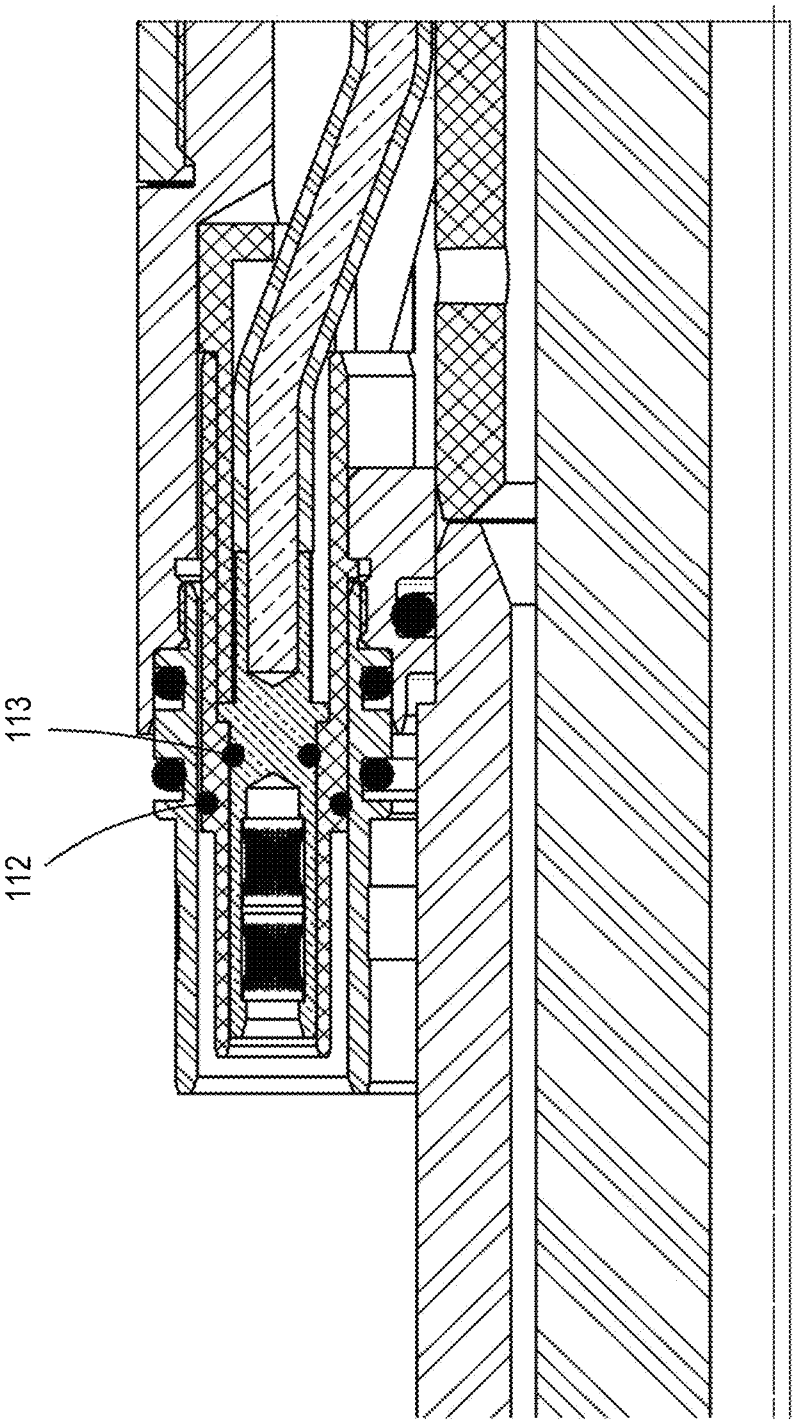
FIG. 12 depicts a second cross-sectional view through one of the phases of the connection, showing the example connection receptacle in the motor head, according to some embodiments.

In some embodiments, O-rings may be utilized in a different configuration to prevent motor oil leakage. FIG. 12 depicts a second cross-sectional view of the example connection receptacle in the motor head, according to some embodiments. In these embodiments, the connector arrangement in the motor head adaptor 101 may include the O-Ring 112 and O-Ring 113 may be introduced to prevent motor fluid leakage from the motor 100 during servicing. The O-Ring 112 may create the sealing between the power socket front electrical insulator 106 and the receptacle guide tube 102, whereas the O-Ring 113 may stop the motor fluid leak between the power pin 207 and the power socket front electrical insulator 106. There may not be a need for a customized protective cap during servicing. In some embodiments, dielectric grease may be used in the axial cavity 220 of the slimline connector 200. The grease may fill all the voids inside the slimline connector 200, as oil will not reach these voids when the slimline connector 200 is connected to terminals in the motor head adaptor 101. The voids may damage the slimline connector 200 if not filled. For example, the grease may be used to eliminate the voids from the connector, as these voids at atmospheric pressure may cause significant differential pressure between the well bore and the interior of the slimline connector 200 across the sealing grommet 209 and the epoxy resin 211 when the slimline connector 200 is deployed in a wellbore.

Figure 13:
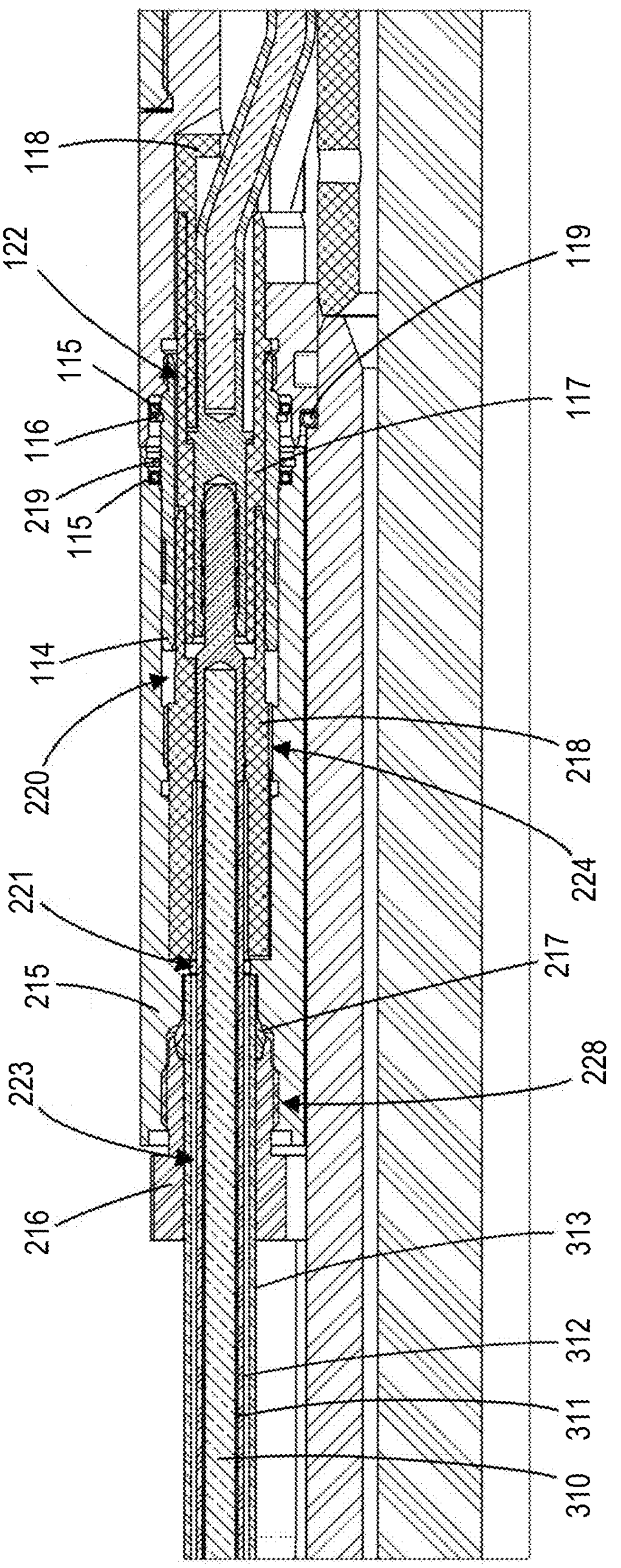
FIG. 13 depicts a second cross-sectional view through one of the phases the connection, showing the example slimline connector mated with the motor head, according to some embodiments.

In some embodiments, the slimline connector 200 may be configured with components for use in various temperature applications. FIG. 13 depicts a second cross-sectional view of the example slimline connector mated with the motor head, according to some embodiments. In some embodiments, the slimline connector 200 may be configured for use in high-temperature applications such as Steam Assisted Gravity Drainage (SAGD). In some embodiments, the seal may be formed between the connector housing 215 and the receptacle guide tube 114 by means of one or more metallic C-Rings 115. When the slimline connector 200 is fully engaged with the receptacle guide tubes 114, the metallic C-Ring 115 may form the seal between the sealing face 214 of the connector housing 215 and the sealing surface 120 (shown in FIG. 15) on the receptacle guide tube 114. The retaining ring 219 may provide a retention method for the metallic C-Ring 115 during the slimline connector 200 dis-engagement. When the slimline connector 200 is fully engaged with the receptacle guide tubes 114, the insulators 218 and 117 may overlap and increase the insulation thickness and the high voltage arc tracking length over the power pin 207 and the power socket 104 connection. Motor oil from the motor internal volume 110 may transfer from the motor 100 to the slimline connector 200 through the annular gap 122 between the power socket front electrical insulator 117 outer diameter and the bore in the motor head adaptor 101 and the receptacle guide tube 114 inner diameters. The motor oil may fill the axial cavity 220, the annular area 221 between the motor lead extension (MLE) 300 and insulation jacket 312 outer diameter, and between the connector housing 215 and the axial cavity 220 internal diameter. The motor oil may additionally fill the annular area between the tubing 313 outer diameter and compression fitting sealing glands 217. In some embodiments, the annular area 223 between the insulation jacket 312 outer diameter and the tube 313 inside diameter may be pre-filled with grease.

In some embodiments, the elastomeric seals such as the elastomeric O-ring 103 may fail in the above-described high-temperature scenarios. For high temperature application, where the standard elastomer type of sealing may not be successfully employed, a method of metal-to-metal sealing system using the metallic C-ring 115 may be used when connecting into to motor head interface. Typical elastomeric seals may fail at or above temperatures approaching 400 degrees Fahrenheit. However, the metallic C-ring 115 may overcome this challenge and withstand higher temperatures. Further, the metallic C-rings 115 may be designed to deflect but not permanently deform under a high compressive stress. The seals formed using the metallic C-rings 115 (C-Seals) may perform well in applications where temperature becomes an issue for elastomeric seals. The C-rings may be customized to fit into smaller cross-section sealing profiles than a standard O-Ring (such as the elastomeric O-ring 103). The metallic C-rings 115 may also provide benefits such as corrosion resistance, robustness in the subsurface, and the C-rings may be easy to install by an operator.

Figure 14:
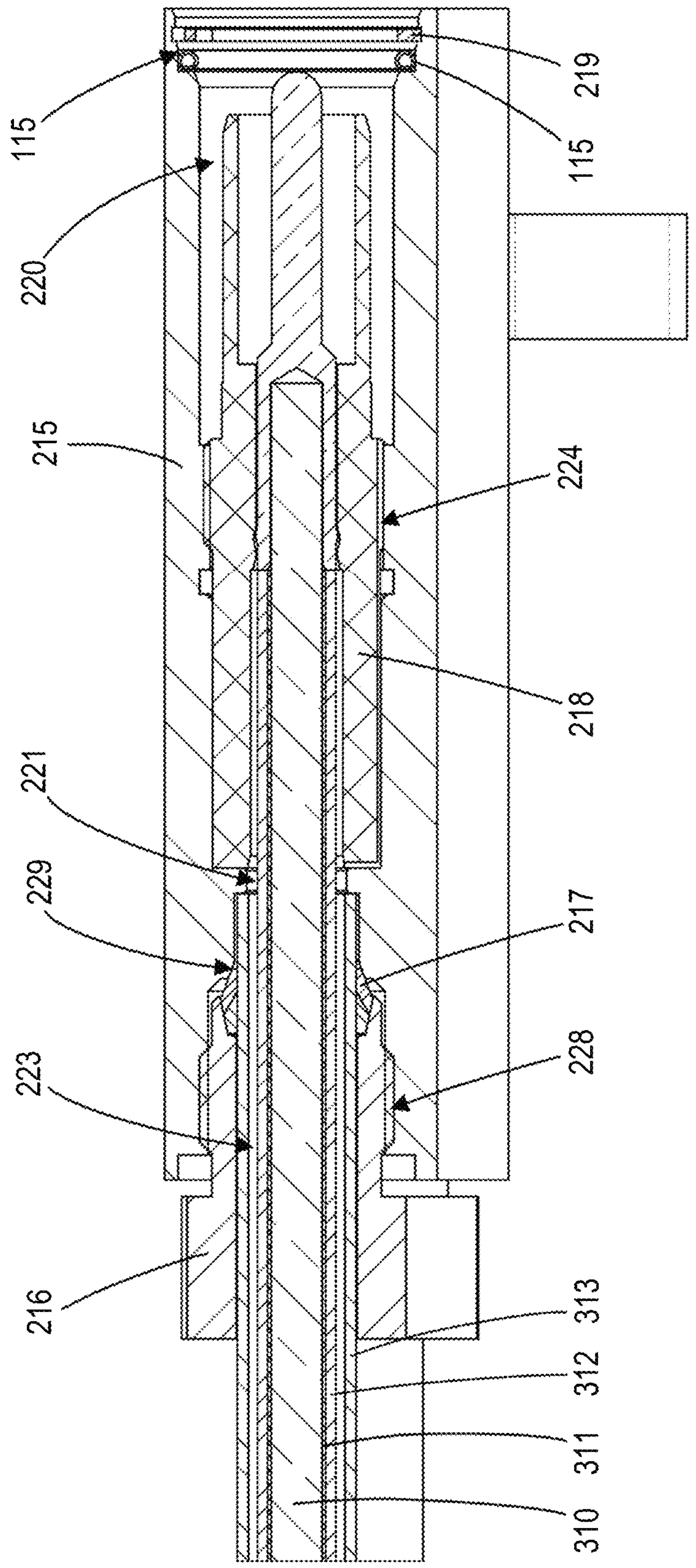
FIG. 14 depicts a second cross-sectional view of the example slimline connector through one of the phases of the connection, according to some embodiments.

Other configurations of the electrical connector system inside the motor 100 may be utilized. FIG. 14 depicts a second cross-sectional view of the example slimline connector through one of the phases of the connection, according to some embodiments. In some embodiments, the slimline connector 200 may comprise: the connector housing 215, the metallic C-Ring 115, the retaining ring 219, the power pin 207, the power pin electrical insulator 218, the compression fitting 216, and the compression fitting sealing glands 217. The connector housing 215 may include the plurality of axial cavities 220 as described earlier. The power pin electrical insulators 218 may be secured in the connector housing 215 and axial cavity 220 by means of a threaded connection 224. In some embodiments, the material of the power pin electrical insulator 218 may comprise ceramic or a material of similar qualities. The power pin 207 may terminate onto the solid copper conductor 310 of the motor lead extension (MLE) 300. In some embodiments, the power pins 207 may be threaded and crimped onto the copper conductor 310.

In some embodiments, the motor lead extension (MLE) 300 may consist of a tubing cladded high temperature power cable. This cable may comprise: the solid copper conductor 310, a high dielectric insulation 311, a high temperature electrical insulation jacket 312, and a tubing 313. The compression fitting 216 and the compression fitting sealing glands 217 may be installed over the tubing 313 of the motor lead extension (MLE) 300 individual phases in the order listed above. After the components are installed on each individual phase of the motor lead extension (MLE) 300, the three phases may be inserted into the connector housing 215 simultaneously. The power pins 207 may locate firmly inside the power pin electrical insulators 218. By threading in the compression fitting 216 into a tapped hole 228 in the connector housing 215, the compression fitting sealing glands 217 may become compressed against the tapered sealing face 229 of the connector housing 215 and the axial cavity 220. The compression fitting sealing glands 217 may slide axially along the insulation jacket 312 and, due to the tapered sealing face 229, may be compressed radially onto the tubing 313. A metal-to-metal seal may be formed between the tapered sealing face 229 and the compression fitting sealing glands 217 outer diameter and between the compression fitting sealing glands 217 inner diameter and the tubing 313 outer diameter. The rate of compression of the compression fitting sealing glands 217 onto the tubing 313 may be determined by a pre-defined torque value applied to the compression fitting 216.

Figure 15:
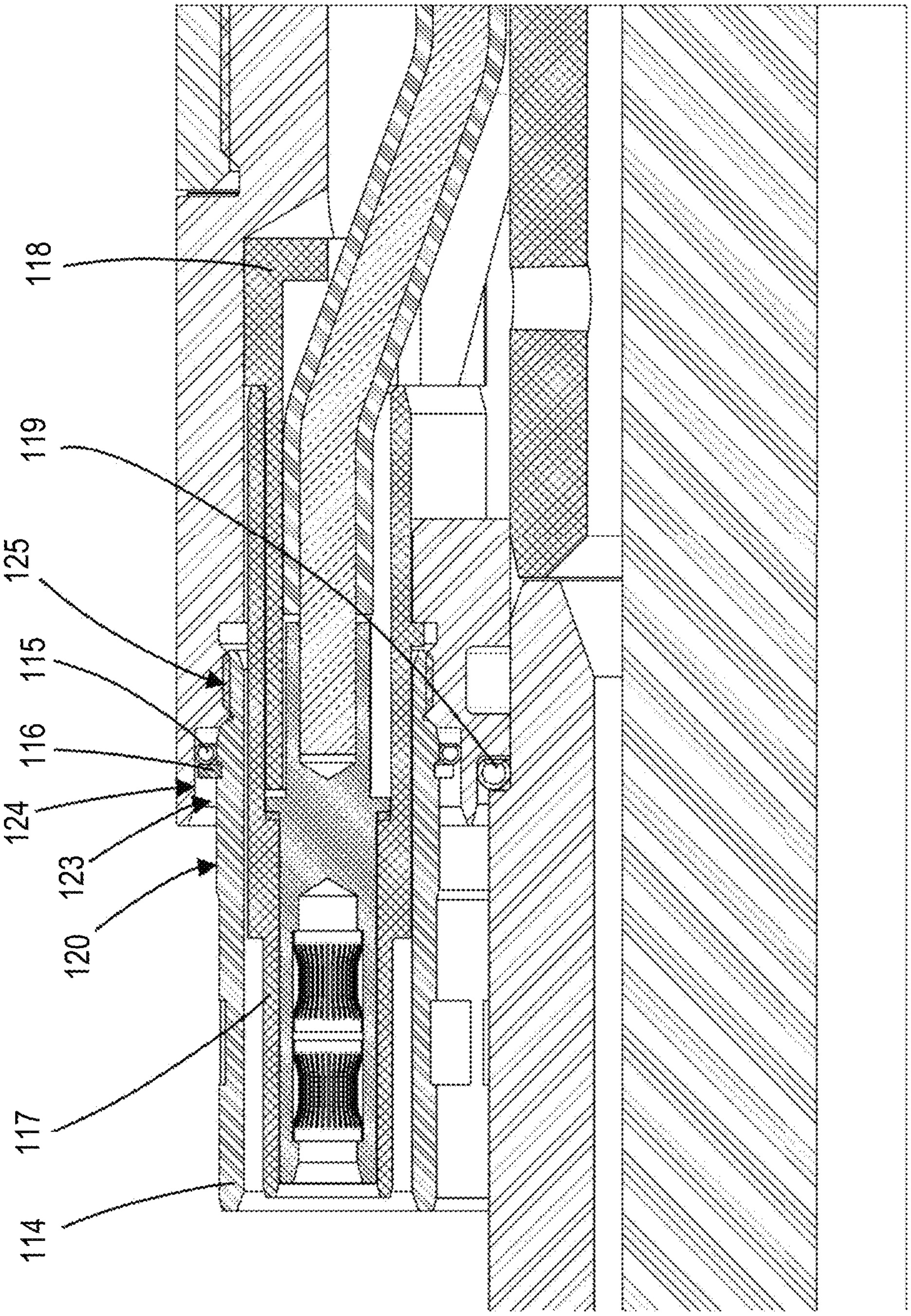
FIG. 15 depicts a third cross-sectional view through one of the phases of the connection, showing the example connection receptacle in the motor head, according to some embodiments.

FIG. 15 depicts a third cross-sectional view of the example connection receptacle in the motor head, according to some embodiments. In FIG. 15, the electrical connector inside the motor head adaptor 101 may comprise: the power socket 104, the electrical contact 105, a power socket front electrical insulator 117, a power socket rear electrical insulator 118, the receptacle guide tube 114, the metallic C-rings 115 and the retaining ring 116. In some embodiments, the receptacle guide tube 114 may be secured into the motor head adaptor 101 by means of the threaded connection 125. The power socket 104 may be terminated onto the motor lead 140. The power socket 104 may be crimped or soldered onto the stranded core of the motor lead 140. In some embodiments, the electrical receptacle may comprise of the power socket 104 and lamella contacts 105. In some embodiments, the electrical contacts 105 may be comprised of lamella contacts. The lamella contacts 105 and the power socket 104 may be made from a copper alloy or a nickel alloy to maintain their mechanical strength and electrical performance at high temperatures. The lamella contacts 105 and the power socket 104 (made from a copper alloy) may also be plated with various materials (nickel, gold) to ensure electrical performance of the contact faces at high temperatures and to avoid corrosion.

The power socket 104 may be surrounded by the power socket front electrical insulator 117 and the power socket rear electrical insulator 118. The power socket rear electrical insulator 118 may also enclose part of the motor lead 140. In some embodiments, the insulators may be comprised of ceramic or other suitable material.

In some embodiments, to prevent fluid migration between the well bore and the motor internal volume 110, metal sealing rings may be utilized. The metallic C-Ring 119 may provide the sealing between the motor head adaptor 101 and the motor head 130 by metal-to-metal contact. The metallic C-Ring 115 may additionally provide the sealing between the motor head adaptor 101 and the receptacle guide tubes 114 when the metallic C-Ring 115 is inserted into the annular gap 123 between sealing surface 120 of the receptacle guide tube 114 and the counter bore sealing surface 124 in the motor head adaptor 101. The retaining ring 116 may locate the metallic C-Ring 115 inside the counter bore in the motor head adaptor 101 and prevent the axial movement of the C-Ring seal formed by the metallic C-ring 115. In some embodiments, when servicing the motor in the shop and the electric submersible pump (ESP) in the field, motor oil from the motor inside the motor internal volume 110 may escape through the annular gap 122 between the power socket front electrical insulator 117 outer diameter and the receptacle guide tube 114 internal diameter. One or more customized protective caps with O-Rings (not shown in this embodiment) may be installed over the receptacle guide tubes 114 to prevent motor oil leakage during the motor or ESP servicing.

Figure 16:
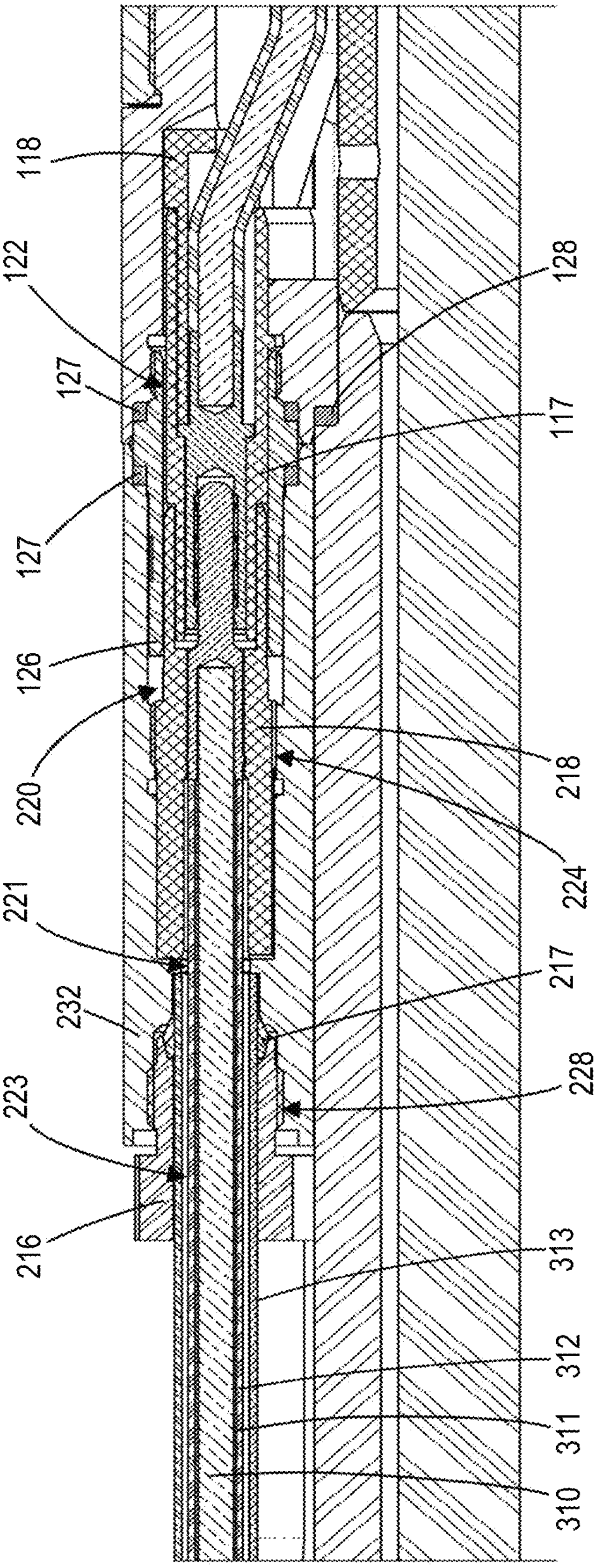
FIG. 16 depicts a cross-sectional view through one of the phases of the connection, showing the connector mated with the motor head using an alternative sealing method, according to some embodiments.

In some embodiments, the motor connector arrangement for high temperature applications, like Steam Assisted Gravity Drainage (SAGD), as depicted in FIG. 13 may use an alternate sealing method. FIG. 16 depicts a cross-sectional view through one of the phases of the connection, showing the slimline connector mated with the motor head using an alternative sealing method, according to some embodiments. In this embodiment, the seal may be formed between the connector housing 232 and the receptacle guide tube 126 by means of a graphite sealing gasket 127. When the slimline connector 200 is fully engaged with the receptacle guide tubes 126, the graphite sealing gasket 127 may be compressed into the cavity formed by connector-housing bore faces 233*a* and 233*b* and receptacle guide tube faces 134*a* and 134*b*. The graphite sealing gasket 127 may be designed and sized such that when compressed into the formed cavity, the gasket may expand to fill the cavity produced by the faces mentioned above, thus creating a pressure tight seal.

When the slimline connector 200 is fully engaged with the receptacle guide tubes 126, the insulators 218 and 117 may overlap and increase the insulation thickness and the high voltage arc tracking length over the power pin 207 and the power socket 104 connection. Motor oil from the motor internal volume 110 may transfer from the motor 100 to the slimline connector 200 through the annular gap 122 between the power socket front electrical insulator 117 outer diameter and the bore in the motor head adaptor 101. The motor oil may additionally transfer between the receptacle guide tube 126 inner diameters and fill the axial cavity 220, as well as the annular area 221 between the motor lead extension (MLE) 300 and the insulation jacket 312 outer diameter, and between the connector housing 232 and the axial cavity 220 internal diameter. The motor oil may also fill the annular area between the tubing 313 outer diameter and compression fitting sealing glands 217. In some embodiments, the annular area 223 between the insulation jacket 312 outer diameter and the tube 313 inside diameter may be pre-filled with grease.

Figure 17:
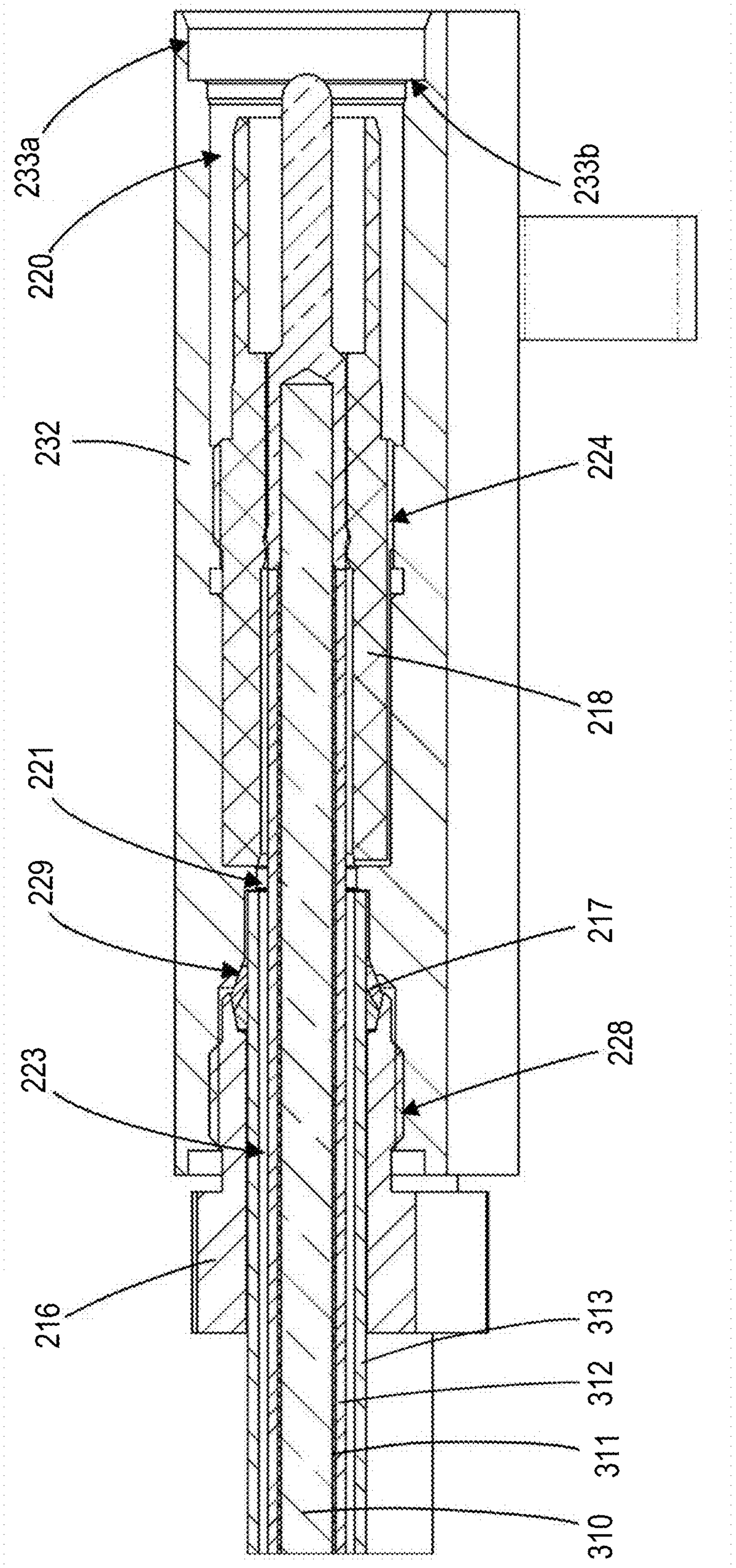
FIG. 17 depicts a third cross-sectional view of the example slimline connector through one of the phases of the connection, according to some embodiments.
Figure 18:
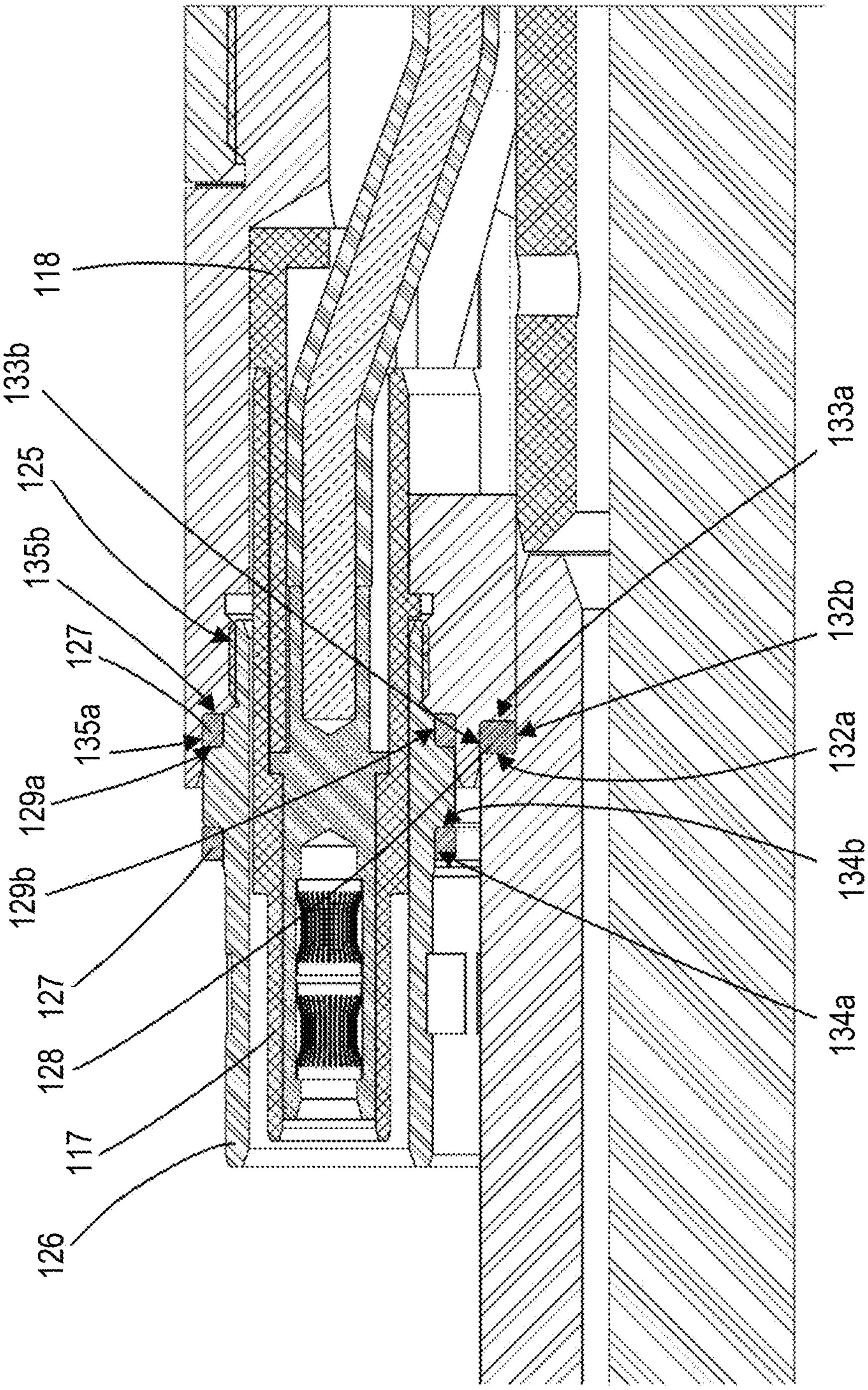
FIG. 18 depicts a fourth cross-sectional view through one of the phases of the example connection receptacle in the motor head, according to some embodiments.

FIGS. 17 and 18 depict alternate embodiments of the example slimline connector. FIG. 17 depicts a third cross-sectional view of the example slimline connector through one of the phases of the connection, according to some embodiments. In this alternate embodiment, the slimline connector 200 may comprise: the connector housing 232, the power pin 207, the power pin electrical insulator 218, the compression fitting 216 and the compression fitting sealing glands 217. The connector housing may include the plurality of axial cavities 220 (machined holes) as described earlier. In some embodiments, the power pin electrical insulators 218 may be secured in the connector housing 232 within the axial cavity 220 by means of a threaded connection 224. In some embodiments, the material of the power pin electrical insulator 218 may comprise ceramic or other suitable material. The power pin 207 may be terminated onto the solid copper conductor 310 of the motor lead extension (MLE) 300. In some embodiments, the power pins 207 may be threaded and crimped onto the copper conductor 310.

In some embodiments, the motor lead extension (MLE) 300 may consist of a tubing-cladded high temperature power cable. This cable may comprise: a solid copper conductor 310, a high dielectric insulation 311, a high temperature electrical insulation jacket 312 and a tubing 313. The compression fitting 216 and the compression fitting sealing gland 217 may be installed over the tubing 313 of the motor lead extension (MLE) 300 individual phases in the order listed above. After the components are installed on each individual phase of the motor lead extension (MLE) 300, the three phases may be inserted into the connector housing 232 on the motor simultaneously. The power pins 207 may be located firmly inside the power pin electrical insulators 218. By threading in the compression fitting 216 into the tapped hole 228 in the connector housing 232, the compression fitting sealing glands 217 may become compressed against the tapered sealing face 229 of the connector housing 232 within the axial cavity 220. The compression fitting sealing glands 217 may slide axially along the insulation jacket 312 and, due to the tapered sealing face 229, may be compressed radially onto the tubing 313. A metal-to-metal seal may form between the tapered sealing face 229 and the compression fitting sealing glands 217 outer diameter and between the compression fitting sealing glands 217 inner diameter and the tubing 313 outer diameter. The rate of compression of the compression fitting sealing glands 217 onto the tubing 313 may be determined by a pre-defined torque value applied to the compression fitting 216.

FIG. 18 depicts a fourth cross-sectional view of the example connection receptacle in the motor head, according to some embodiments. In this embodiment, the electrical connector inside the motor head adaptor 101 may comprise: the power socket 104, the electrical contact 105, the power socket front electrical insulator 117, the power socket rear electrical insulator 118, the receptacle guide tube 126 and the graphite sealing gaskets 127.

In some embodiments, the lamella contacts 105 and the power socket 104 may be made from a copper alloy or a nickel alloy to maintain their mechanical strength and electrical performance at high temperatures. The lamella contacts 105 and the power socket 104 made from a copper alloy may also be plated with various materials (nickel, gold) to ensure electrical performance of the contact faces at high temperatures and to avoid corrosion.

The receptacle guide tube 126 may be secured into the motor head adaptor 101 by means of the threaded connection 125. The power socket 104 may be terminated onto the motor lead 140. In some embodiments, the power socket may be crimped or soldered onto the stranded core of the motor lead 140. In some embodiments, the electrical receptacle comprises of the power socket 104 and lamella contacts 105. The power socket 104 may be surrounded by the power socket front electrical insulator 117 and the power socket rear electrical insulator 118. The power socket rear electrical insulator 118 may also enclose part of the motor lead 140. In some embodiments, the insulators may be comprised of ceramic or a similar material which may tolerate the subsurface environment of the ESP.

In this embodiment, to prevent fluid migration between the well bore and the motor internal volume 110, graphite sealing gaskets may be utilized. The sealing between the motor head adaptor 101 and the motor head 130 may be achieved by compressing the graphite sealing gasket 128 into the cavity formed by faces 133*a* and 133*b* on the motor head adaptor 101 and faces 132*a* and 132*b* on the motor head 130, when the motor head 130 is fully engaged inside the motor head adaptor 101. A graphite sealing gasket 128 may be designed and sized such that when compressed into the formed cavity, it expands and fills the cavity produced by the faces mentioned above, thus creating the pressure tight seal.

In some embodiments, a graphite sealing gasket 127 may provide the seal between the motor head adaptor 101 and the receptacle guide tubes 126 when the graphite sealing gasket 127 is compressed into the cavity formed by the motor head adaptor 101 faces 135*a* and 135*b* and the receptacle guide tube 126 faces 129*a* and 129*b*. The graphite sealing gasket 127 may be designed and sized such that when compressed into the formed cavity, the graphite sealing gasket 127 may expand and fill the cavity produced by the faces mentioned above, thus creating the pressure tight seal. In some embodiments, when servicing the motor in the shop and the electric submersible pump (ESP) in the field, motor oil from the motor inside the motor internal volume 110 may escape through the annular gap 122 between the power socket front electrical insulator 117 outer diameter and the receptacle guide tube 114 internal diameter. A customized protective cap with O-Rings (not shown in this embodiment) may be installed over the receptacle guide tubes 114 and may be used to prevent motor oil leak during the motor or ESP servicing.

Example ESP System

An example ESP system (application) in which a conductive cable (as described herein) may be used is now described. FIG. 19 depicts an example well system having an ESP, according to some embodiments. FIG. 19 depicts a well system 1900. While the well system 1900 illustrates a land-based subterranean environment, example implementations contemplate any well site environment including a subsea environment. In one or more embodiments, any one or more components or elements may be used with subterranean operations equipment located on offshore platforms, drill ships, semi-submersibles, drilling barges and land-based rigs.

In some embodiments, the well system 1900 may be positioned (at least partially) in a wellbore 1904 below a surface 1902 in a formation 1924. The wellbore 1904 may comprise a vertical, deviated, horizontal, or any other type of wellbore. The wellbore 1904 may be defined in part by a casing 1906 that may extend from the surface 1902 to a selected downhole location. Portions of the wellbore 1904 that do not comprise the casing 1906 may be referred to as open hole.

Various types of hydrocarbons or fluids may be pumped from the wellbore 1904 to the surface 1902 using a pump system 1950 disposed or positioned downhole, for example, within, partially within, or outside the casing 1906 of the wellbore 1904. In some implementations, the pump system 1950 may comprise an electric submersible pump (ESP) system. The well system 1900 may include an electrical cable 1910 (round cable) and a motor lead extension (MLE) 1911 (flat cable).

The pump system 1950 may comprise a pump 1908, a pump flow control system 1912, a seal or equalizer 1914, a motor 1916, and a downhole sensor 1918. The pump 1908 may be an ESP, including but not limited to, a multi-stage centrifugal pump, a rod pump, a progressive cavity pump, any other suitable pump system or combination thereof. The pump 1908 may transfer pressure to the fluid 1926 or any other type of downhole fluid to propel the fluid from downhole to the surface 1902 at a desired or selected pumping rate. The pump 1908 may be coupled to a pump flow control system 1912 comprising a housing 1913. The motor 1916 may, in some embodiments, be a permanent magnet motor (PMM) or a comparable motor to drive the pump 1908 and may be coupled to at least the downhole sensor 1918. The MLE 1911 may be coupled to the motor 1916. In some embodiments, the MLE 1911 may connect into the slimline connector 200 at the motor 1916. The slimline connector 200 may be coupled to the motor 1916 at the surface by an operator prior to deployment in the wellbore 1904. The electrical cable 1910 may provide power to the motor 1916 via the MLE 1911, transmit one or more control or operation instructions from the controller 1920 to the motor 1916, or both. The electrical cable 1910 may be communicatively coupled to the controller 1920 and also to a flowmeter 1921 disposed at the surface 1902. The flowmeter 1921 may be replaced with any suitable sensor utilized to measure a parameter of the fluid 1926.

The fluid 1926 may be a multi-phase wellbore fluid comprising one or more hydrocarbons. For example, the fluid 1926 may be a two-phase fluid that comprises a gas phase and a liquid phase from a wellbore or reservoir in the formation 1924. The fluid 1926 may enter the wellbore 1904, the casing 1906 or both through one or more perforations 1930 in the formation 1924 and flow uphole to one or more intake ports 1927 of the pump system 1950, wherein the one or more intake ports 1927 may be disposed at a distal end of the pump 1908. The pump 1908 may transfer pressure to the fluid 1926 by adding kinetic energy to the fluid 1926 via centrifugal force and converting the kinetic energy to potential energy in the form of pressure. The pump 1908 may lift the fluid 1926 to the surface 1902.

The motor 1916 may include an electric submersible motor configured or operated to turn the pump 1908 and may, for example, be a two or more-pole, three-phase squirrel cage induction motor or a permanent magnet motor (PMM). However, other motor configurations may be possible. A production tubing section 1922 may couple to the pump 1908 using one or more connectors 1928 or may couple directly to the pump 1908. Any one or more production tubing sections 1922 may be coupled together to extend the pump system 1950 into the wellbore 1904 to a desired or specified location.

Example Flowchart

Figure 20:
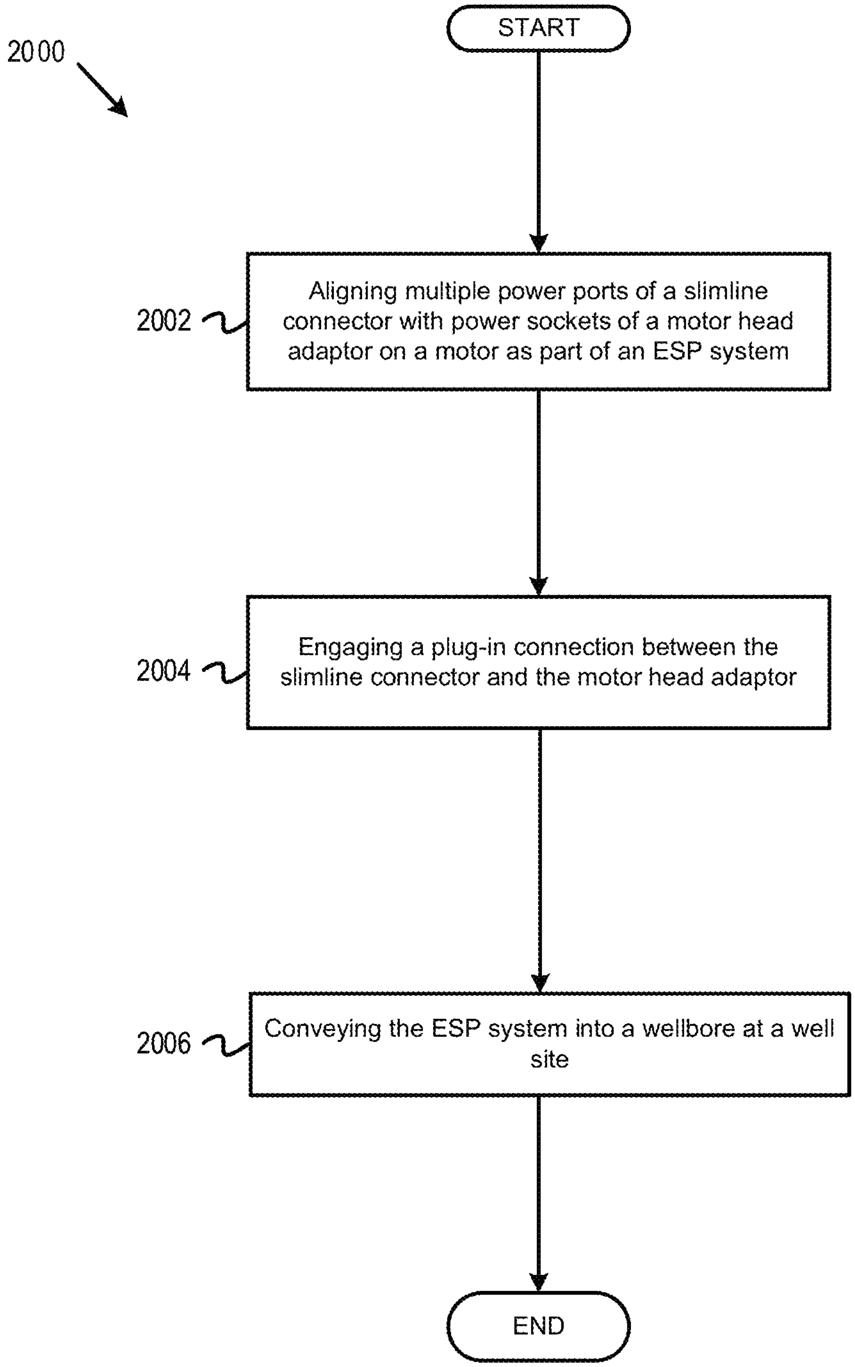
FIG. 20 depicts a flowchart of example operations, according to some embodiments.

FIG. 20 depicts a flowchart of example operations, according to some embodiments. The operations in FIG. 20 are described with reference to the slimline connector and multiple components of the connection with the motor head adaptor as described in FIGS. 1-19. These names are for reading convenience and the operations in FIG. 20 may be performed by any component with the functionality described below. Operations of a flowchart 2000 begin at block 2002.

At block 2002, multiple power ports circumferentially disposed on the slimline connector 200 are aligned with power sockets 104 circumferentially disposed on a motor head adaptor 101 coupled with the motor 100 attached to an electric submersible pump (ESP) system, according to some embodiments. Each power port (also known as phases of the connection) may comprise a power pin 207 and the concentric power pin insulator 208 disposed within an axial cavity 220 behind a sealing face 214 of the slimline connector 200. The slimline connector 200 comprises three phases, and these phases may be aligned with three power sockets 104 on the motor head adaptor 101 by a user or operator at the surface. In some embodiments, prior to aligning the multiple power ports, protective caps may be removed from the sealing face 214 of the slimline connector 200 and from one or more receptacle guide tubes 102 on the motor head adaptor 101. These protective caps may provide protection against weather (rain, snow, etc.) or dust during transport until the slimline connector 200 is prepared for connection to the motor head adaptor 101. Flow progresses to block 2004.

At block 2004, the slimline connector 200 is engaged via a plug-in connection to the motor head adaptor 101, according to some embodiments. The power pins 207 may be guided by a user or operator into the receptacle guide tubes 102 (one per power socket) simultaneously until the power pin 207 is engaged with the electrical contact 105 of the motor head adaptor 101. The design of the slimline connector 200 (and may enable this connection to be a quick, plug-in connection into the motor head adaptor 101. Flow progresses to block 2006.

At block 2006, the ESP system comprising at least the slimline connector 200, motor lead extension (MLE) 300, the motor 100, and the motor head adaptor 101 is lowered into a wellbore at a well site. Once the plug-in connection between the power ports of the slimline connector 200 and the power sockets 104 of the motor head adaptor 101 is engaged, the ESP coupled to the motor 100 may be conveyed downhole. Power may be supplied through the slimline connector 200 to the motor 100, and the ESP may pump fluid to the surface. Flow of flowchart 2000 ceases.

Example Embodiments

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

Embodiment #1: An apparatus comprising: a slimline connector to connect a motor lead extension (MLE) to an electric motor of an electric submersible pump (ESP) to be positioned in a wellbore, the electric motor having a rotational axis, and wherein the slimline connector comprises: multiple power ports positioned circumferentially around an axis of the slimline connector, wherein the axis of the slimline connector is parallel with the rotational axis of the electric motor, and wherein each port of the multiple power ports is associated with a different electrical phase.

Embodiment #2: The apparatus of Embodiment 1, wherein the multiple power ports are placed at a predefined distance from one another to avoid an electrical failure between phases.

Embodiment #3: The apparatus of any one of Embodiments 1-2, further comprising a plurality of axial cavities, wherein each axial cavity is positioned at pre-defined radial and angular location on an end face of the slimline connector.

Embodiment #4: The apparatus of Embodiment 3, wherein each axial cavity comprises a power pin, wherein the power pin is connected to a copper conductor, and wherein the power pin is to be inserted into a corresponding power socket on a motor head adaptor.

Embodiment #5: The apparatus of Embodiment 4, wherein each power pin of the slimline connector includes a concentric power pin insulator.

Embodiment #6: The apparatus of any one of Embodiments 4-5, further comprising: one or more axial holes on either side of the slimline connector; and for each axial hole, a lug used to secure the slimline connector to the motor head adaptor.

Embodiment #7: A connector and motor head adaptor system configured to form a plug-in connection to provide power to an electric motor of an electric submersible pump (ESP) to be positioned in a wellbore, the connector and motor head adaptor system comprising: a slimline connector comprising multiple power ports positioned circumferentially around an axis of the slimline connector, wherein each port of the multiple power ports is associated with a different electrical phase; a motor lead extension coupled to the slimline connector; a motor head adaptor comprising multiple circumferentially disposed power sockets; and the electric motor, wherein the electric motor has a rotational axis, and wherein the axis of the slimline connector is parallel with the rotational axis of the electric motor.

Embodiment #8: The connector and motor head adaptor system of Embodiment 7, wherein the multiple power ports are placed at a predefined distance from one another to avoid an electrical failure between phases.

Embodiment #9: The connector and motor head adaptor system of any one of Embodiments 7-8, further comprising a plurality of axial cavities, wherein each axial cavity is positioned at pre-defined radial and angular location on an end face of the slimline connector, and wherein each axial cavity comprises a power pin.

Embodiment #10: The connector and motor head adaptor system of Embodiment 9, wherein each power pin of the slimline connector is connected to a copper conductor, and wherein each power pin includes a concentric power pin insulator.

Embodiment #11: The connector and motor head adaptor system of any one of Embodiments 7-10, further comprising: one or more axial holes on either side of the slimline connector; and for each axial hole, a lug used to secure the slimline connector to the motor head adaptor.

Embodiment #12: The connector and motor head adaptor system of any one of Embodiments 10-11, wherein the motor head adaptor further comprises: for each power socket, a receptacle guide tube to guard each concentric power pin insulator and to guide the slimline connector during assembly, wherein the receptacle guide tubes are parallel with the rotational axis of the electric motor, and wherein the receptacle guide tubes are comprised of steel.

Embodiment #13: The connector and motor head adaptor system of Embodiment 12, further comprising: one or more graphite sealing gaskets, wherein the one or more graphite sealing gaskets are to form a seal between a connector housing of the slimline connector and each of the receptacle guide tubes.

Embodiment #14: The connector and motor head adaptor system of any one of Embodiments 12-13, further comprising: one or more elastomeric O-rings, wherein the one or more elastomeric O-rings are to form a seal between a connector housing of the slimline connector and each of the receptacle guide tubes.

Embodiment #15: The connector and motor head adaptor system of Embodiment 14, wherein the one or more elastomeric O-rings are to form a seal between each concentric power pin insulator and each of the receptacle guide tubes.

Embodiment #16: The connector and motor head adaptor system of any one of Embodiments 12-15, further comprising: one or more metallic C-rings for use in high-temperature applications, wherein the one or more metallic C-rings form a seal between each receptacle guide tube and the connector housing of the slimline connector.

Embodiment #17: A method comprising: aligning, power ports circumferentially disposed in a slimline connector with power sockets circumferentially disposed on a motor head adaptor coupled with a motor attached to an electric submersible pump (ESP) system; engaging a plug-in connection between the power ports of the slimline connector and the power sockets of the motor head adaptor; and conveying the ESP system into a wellbore.

Embodiment #18: The method of Embodiment 17, further comprising: removing protective caps from the power ports and the power sockets, wherein removing the protective caps is completed by a user at a surface of the wellbore.

Embodiment #19: The method of any one of Embodiments 17-18, wherein engaging the plug-in connection comprises: for each power socket, inserting a power pin into the power socket until a seal between a connector housing and a receptacle guide tube is formed.

Embodiment #20: The method of Embodiment 19, further comprising: supplying power to the ESP through the plug-in connection via a surface power generation unit.

The invention claimed is:

1. An apparatus comprising:

a connector configured to connect a motor lead extension (MLE) to an electric motor of an electric submersible pump (ESP) to be positioned in a wellbore, the electric motor having a rotational axis, and wherein the connector comprises:

multiple power ports concentrically offset around an axis of the connector, wherein the axis of the connector is parallel with the rotational axis of the electric motor; and a connector housing having a rounded exterior configured to align with a curvature of the electric motor, wherein the connector housing is configured to enclose at least a portion of the multiple power ports.

2. The apparatus of claim 1, wherein the multiple power ports are placed at a predefined distance from one another to avoid an electrical failure between phases.

3. The apparatus of claim 1, further comprising a plurality of axial cavities, wherein each axial cavity is positioned at pre-defined radial and angular location on an end face of the connector.

4. The apparatus of claim 3, wherein each axial cavity comprises a power pin, wherein the power pin is connected to a copper conductor, and wherein the power pin is to be inserted into a corresponding power socket on a motor head adaptor.

5. The apparatus of claim 4, wherein each power pin of the connector includes a concentric power pin insulator.

6. The apparatus of claim 4, further comprising:

one or more axial holes on either side of the connector, and for each axial hole, a lug used to secure the connector to the motor head adaptor.

7. A connector and motor head adaptor system configured to form a plug-in connection to provide power to an electric motor of an electric submersible pump (ESP) to be positioned in a wellbore, the connector and motor head adaptor system comprising:

a connector comprising multiple power ports concentrically offset around an axis of the connector, wherein the electric motor has a rotational axis, and wherein the axis of the connector is parallel with the rotational axis of the electric motor;

a connector housing having a rounded exterior configured to align with a curvature of the electric motor, wherein the connector housing is configured enclose at least a portion of the multiple power ports; and a motor head adaptor comprising multiple concentrically offset power sockets.

8. The connector and motor head adaptor system of claim 7, further comprising:

the electric motor; and a motor lead extension coupled to the connector, wherein the multiple power ports are placed at a predefined distance from one another to avoid an electrical failure between phases.

9. The connector and motor head adaptor system of claim 7, further comprising a plurality of axial cavities, wherein each axial cavity is positioned at a pre-defined radial and angular location on an end face of the connector, and wherein each axial cavity comprises a power pin.

10. The connector and motor head adaptor system of claim 9, wherein each power pin of the connector is connected to a copper conductor, and wherein each power pin includes a concentric power pin insulator.

11. The connector and motor head adaptor system of claim 8, further comprising:

one or more axial holes on either side of the connector; and for each axial hole, a lug used to secure the connector to the motor head adaptor.

12. The connector and motor head adaptor system of claim 7, wherein the motor head adaptor further comprises:

for each power socket, a receptacle guide tube to guard each concentric power pin insulator and to guide the connector during assembly, wherein the receptacle guide tubes are parallel with the rotational axis of the electric motor, and wherein the receptacle guide tubes are comprised of steel.

13. The connector and motor head adaptor system of claim 12, further comprising:

one or more graphite sealing gaskets, wherein the one or more graphite sealing gaskets are to form a seal between the connector housing of the connector and each of the receptacle guide tubes.

14. The connector and motor head adaptor system of claim 12, further comprising:

one or more elastomeric O-rings, wherein the one or more elastomeric O-rings are to form a seal between the connector housing of the connector and each of the receptacle guide tubes.

15. The connector and motor head adaptor system of claim 14, wherein the one or more elastomeric O-rings are to form a seal between each concentric power pin insulator and each of the receptacle guide tubes.

16. The connector and motor head adaptor system of claim 12, further comprising:

one or more metallic C-rings for use in high-temperature applications, wherein the one or more metallic C-rings form a seal between each receptacle guide tube and the connector housing.

17. A method comprising:

aligning power ports concentrically offset around an axis of a connector with power sockets concentrically offset on a motor head adaptor, the motor head adaptor coupled with a motor of an electric submersible pump (ESP) system; and engaging a plug-in connection between the power ports of the connector and the power sockets of the motor head adaptor, wherein the axis of the connector is parallel with a rotational axis of the motor.

18. The method of claim 17, further comprising:

removing protective caps from the power ports and the power sockets, wherein removing the protective caps is completed by a user at a surface of a wellbore; and conveying the ESP system into the wellbore after engaging the plug-in connection.

19. The method of claim 17, wherein engaging the plug-in connection comprises:

for each power socket, inserting a power pin into the power socket until a seal between a connector housing and a receptacle guide tube is formed.

20. The method of claim 19, further comprising: supplying power to the ESP through the plug-in connection via a surface power generation unit.

* * * * *